(12) United States Patent
Halberstadt

(10) Patent No.: US 8,699,239 B2
(45) Date of Patent: Apr. 15, 2014

(54) CONTROLLER FOR A RESONANT CONVERTER

(75) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 130 days.

(21) Appl. No.: 13/327,797

(22) Filed: Dec. 16, 2011

(65) Prior Publication Data

US 2012/0163039 A1    Jun. 28, 2012

(30) Foreign Application Priority Data

Dec. 23, 2010    (EP) .................................... 10252219

(51) Int. Cl.
    H02M 3/335    (2006.01)

(52) U.S. Cl.
    USPC ........................................ 363/21.02; 323/284

(58) Field of Classification Search
    USPC ........... 363/21.02, 17, 98, 127, 21.01, 16, 97, 363/95; 323/282, 284
    See application file for complete search history.

(56) References Cited

U.S. PATENT DOCUMENTS

| | | | |
|---|---|---|---|
| 6,018,467 A | 1/2000 | Majid et al. | |
| 7,944,716 B2 | 5/2011 | Halberstadt | |
| 8,014,176 B2 * | 9/2011 | Melanson et al. | ......... 363/21.02 |
| 8,279,628 B2 * | 10/2012 | Melanson | ....................... 363/17 |
| 8,391,026 B2 * | 3/2013 | Santoro et al. | .................. 363/16 |
| 8,422,250 B2 | 4/2013 | Halberstadt | |
| 2006/0013021 A1 | 1/2006 | Aso | |
| 2008/0130324 A1 | 6/2008 | Choi et al. | |
| 2009/0034298 A1 * | 2/2009 | Liu et al. | ........................... 363/17 |
| 2009/0185396 A1 * | 7/2009 | Baurle et al. | ..................... 363/16 |
| 2009/0207635 A1 * | 8/2009 | Elferich | ..................... 363/21.03 |
| 2010/0033998 A1 | 2/2010 | Halberstadt | |
| 2010/0208499 A1 | 8/2010 | Halberstadt | |
| 2011/0002145 A1 | 1/2011 | Halberstadt | |
| 2011/0187335 A1 | 8/2011 | Grakist et al. | |
| 2011/0242856 A1 | 10/2011 | Halberstadt | |
| 2011/0267024 A1 | 11/2011 | Halberstadt | |
| 2012/0127761 A1 * | 5/2012 | Halberstadt et al. | ........ 363/21.02 |
| 2013/0301322 A1 * | 11/2013 | Fornage | ........................... 363/95 |
| 2014/0003094 A1 * | 1/2014 | Sorensen | .................. 363/21.02 |
| 2014/0016365 A1 * | 1/2014 | Maruyama | ................. 363/21.02 |

OTHER PUBLICATIONS

Yungtaek, J. et al. "Light-Load Efficiency Optimization Method", IEEE Trans. on Power Electronics, vol. 25, No. 1, pp. 67-74 (Jan. 2010).

Extended European Search Report for EP Patent Appln. No. 10252219.0 (Nov. 22, 2011).

* cited by examiner

*Primary Examiner* — Gary L Laxton
*Assistant Examiner* — Kyle J Moody

(57) ABSTRACT

Consistent with an example embodiment, there is a controller for a resonant converter, wherein the controller is configured to operate the resonant converter in a high power mode of operation by adjusting a first control parameter to vary the output power and a low power mode of operation by adjusting a second control parameter to vary the output power. The controller is configured to set the value of the first control parameter when changing over between the high power mode of operation and the low power mode of operation such that the output power is substantially consistent during the changing over.

12 Claims, 10 Drawing Sheets

CONTROLLER FOR A RESONANT CONVERTER

This application claims the priority under 35 U.S.C. §119 of European patent application no. 10252219.0, filed on Dec. 23, 2010, the contents of which are incorporated by reference herein.

FIELD OF THE INVENTION

The present disclosure relates to the field of controllers for resonant converters, and in particular, although not exclusively, to controllers that can set control parameters for a changeover between a high power mode of operation and a low power mode of operation of the resonant converter.

BACKGROUND OF THE INVENTION

WO 2009/098640 (NXP B.V.) discloses a method of operating a resonant power converter in a low power mode of operation in which the switching is controlled to allow for improved operation at low power levels. The method involves introducing an interruption to the part of the switching cycle in which the low side switch of the resonant power converter would normally be closed.

The listing or discussion of a prior-published document or any background in the specification should not necessarily be taken as an acknowledgement that the document or background is part of the state of the art or is common general knowledge.

SUMMARY OF THE INVENTION

According to a first aspect of the invention, there is provided a controller for a resonant converter, wherein the controller is configured to operate the resonant converter in:

a high power mode of operation by adjusting a first control parameter to vary the output power; and a low power mode of operation by adjusting a second control parameter to vary the output power; and wherein the controller is configured to set the value of the first control parameter when changing between the high power mode of operation and the low power mode of operation such that the output power is substantially consistent during the changeover.

Setting the value of the first control parameter when changing modes of operation in this way can reduce any discontinuity in the output power at the changeover. For example, as a change in the second control parameter is introduced for the low power mode of operation, the first control parameter is set so as to take the second control parameter into account and maintain a substantially consistent output power.

The first control parameter may be an energy per cycle parameter. The second control parameter may be a period time (Tper) parameter.

The controller may be configured to keep the energy per cycle level constant for the low power mode of operation. In this way, an efficient and economical low power mode of operation can be implemented with an optimal/desired energy per cycle setting. It can be beneficial to vary only one control at a time in order to maintain a simple linear relationship between control input and power.

The controller may be configured to operate the resonant converter in the low power mode of operation by adjusting the first control parameter and second control parameter to vary the output power. In one example, the output power can be set by adjusting both the first and second control parameters for power levels above a threshold level, such as a clamping voltage, and the output power can be set by adjusting only the second control parameter for power levels below a threshold level. In this way, the first control parameter can be brought down to a desired/optimum level during the low power mode of operation, and then fixed at that level for even lower output power levels.

The controller may be configured to operate the resonant converter in the low power mode of operation by:

adjusting only the first control parameter to vary the output power for output power levels above a threshold level, and adjusting the second control parameter, and in some examples only the second control parameter, for output power levels below the threshold level.

The controller may be configured to operate the resonant converter in the low power mode of operation by:

adjusting both the first control parameter and second control parameter to vary the output power for output power levels above a threshold level, and adjusting the second control parameter, and in some examples only the second control parameter, for output power levels below the threshold level.

The controller may be configured to multiply the first control parameter by a factor N when changing between the high power mode of operation and the low power mode of operation. N may correspond to the ratio of the period time (Tper) to the period of energy conversion pulses (Tec) that will be employed in the low power mode of operation.

The period time (Tper) may be the minimum period time that can be used in the low power mode of operation, as in some embodiments this is the value that will be used immediately after the changeover from the high power mode of operation to the low power mode of operation.

In some examples, a low power mode of operation with an "energy dump" can be used, and this can affect the minimum value for the period time (Tper) that can be achieved and therefore can also affect the value of N.

Further comprising an input representative of the number of energy conversion pulses (P) that are to be included in the period of energy conversion pulses. The number of energy conversion pulses (P) can affect the period of energy conversion pulses (Tec). In this way, a user input can be provided to control the value of N that will be used as the period of energy conversion pulses (Tec) will vary in accordance with the number of energy conversion pulses (P) that are used.

The controller may be configured to provide switch control signals to the resonant converter in order to control the output power in accordance with the control parameters of the high or low power mode of operation.

The controller may be configured to apply a minimum time interval between successive power mode changes. In this way, unnecessary repetitive changeover between power modes can be reduced.

The controller may be configured to prevent a changeover between high power mode and low power mode during one or more specific sub-states of a mode timing sequence, which may be a high power mode sequence. Such a changeover can be from the high power mode to the low power mode, or from the low power mode to the high power mode. In this way, the likelihood of introducing a discontinuity in the output power when changing mode of operation can be reduced.

The controller may be configured to operate the resonant converter in a burst mode of operation, wherein the converter is configured to prevent the switching frequency within the burst on time from corresponding to an audible frequency of the human ear. The controller may be configured to prevent the frequency of operation in burst mode from dropping below about 20 kHz.

There may be provided a resonant converter comprising any controller disclosed herein.

There may be provided an integrated circuit comprising any controller, resonant converter or circuit disclosed herein.

According to a further aspect of the invention, there is provided a method of operating a resonant converter, wherein the resonant converter is operable in:

a high power mode of operation by adjusting a first control parameter to vary the output power; and a low power mode of operation by adjusting a second control parameter, or first control parameter, or first and second control parameter, to vary the output power; the method comprising:

setting the value of the first control parameter when changing between the high power mode of operation and the low power mode of operation such that the output power is substantially consistent during the changeover.

The low power mode of operation may involve adjusting one or more of:

the second control parameter,
the first control parameter, and
first and second control parameter,
for different output power levels.

At the changeover from the high power mode to the low power mode, the second control parameter (such as period time (Tper)) may be introduced, and require the first control parameter to be set so as to keep the output power substantially consistent during the changeover, even if the second control parameter is not adjusted for the output power levels that occur when the resonant converter first enters the low power mode.

There may be provided an integrated circuit comprising any controller, converter, circuit or apparatus disclosed herein.

There may be provided a computer program, which when run on a computer, causes the computer to configure any apparatus, including a controller, converter, circuit or apparatus disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium such as a disc or a memory device, or may be embodied as a transient signal. Such a transient signal may be a network download, including an internet download.

BRIEF DESCRIPTION OF THE DRAWINGS

A description is now given, by way of example only, with reference to the accompanying drawings, in which.

One or more embodiments of the invention relate to a resonant converter that can operate in a high power mode of operation by adjusting a first control parameter (such as "energy per cycle") to vary the output power and a low power mode of operation by adjusting a second control parameter (such as period time (Tper)) to vary the output power. A controller can be provided to set the value of the first control parameter when changing between the high power mode of operation and the low power mode of operation such that the output power is substantially consistent during the changeover. The first control parameter can be set to take into account any fluctuation in power that would otherwise occur, for example by a change in, or introduction of, the second control parameter.

It is known to use resonant converter topologies for power converters operating at powers levels larger than approximately 100 Watt at full load, due to their high efficiency and small volumes/high power density.

There are several known types of resonant converters, using either half bridge or full bridge configurations. Also, the number of resonant components can be different for different types of resonant converters. The series resonant converter forms the basis for other resonant topologies, and a general circuit diagram of a series resonant converter 100 is provided as FIG. 1.

Figure 1:
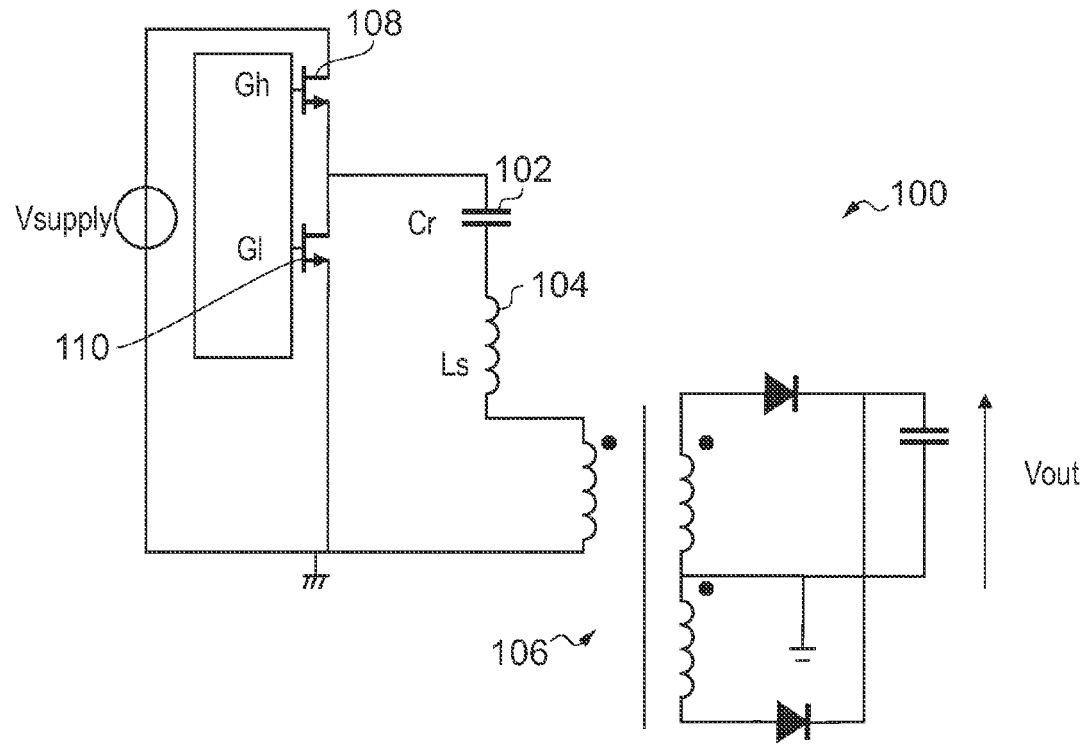
FIG. 1 illustrates schematically a series resonant converter.

The resonant components of the series resonant converter 100 of FIG. 1 are a capacitor Cr 102 and an inductor Ls 104. As the magnetizing inductance of the transformer 106 is relatively large, it does not significantly influence the resonant cycle.

There is a known desire to have a low voltage across the high side and low side switches 108, 110 when they are switched on in order to reduce turn on losses. This can be known as "soft switching". Due to the large value of the magnetizing inductance of transformer 106 in the series resonant converter 100, the stored energy in the magnetizing inductance is not sufficient to provide for soft switching. The current in the inductor Ls 104 is therefore necessary to obtain soft switching.

Multi resonant converters are derived from the basic series resonant converter 100 shown in FIG. 1. The term 'multi' refers to the fact that more than two components contribute to the resonance. One type of multi resonant converter is the LLC converter 200 as shown in FIG. 2.

Figure 2:
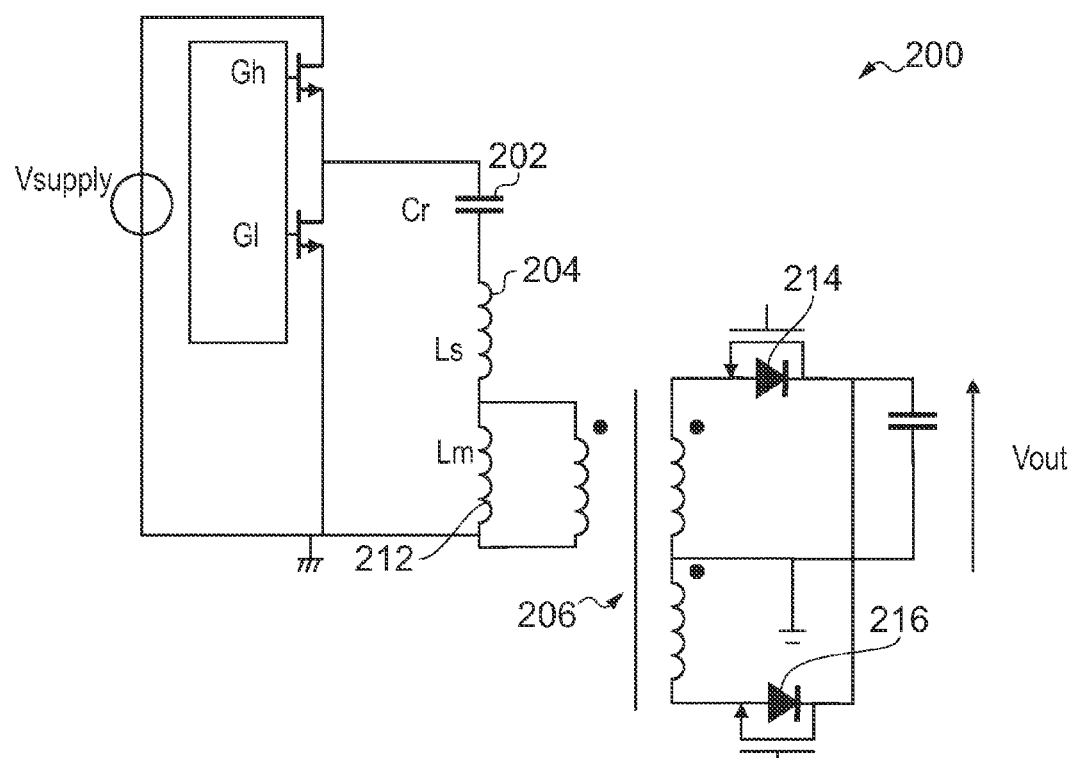
FIG. 2 illustrates schematically an LLC converter.

For the LLC converter of FIG. 2, the magnetizing inductance of the transformer 206 also contributes to the resonance and is shown in FIG. 2 as inductor Lm 212. Therefore, the resonant circuit (also known as a resonant tank) for the LLC converter of FIG. 2 consists of two inductors (Lm 212 and Ls 204) and one capacitor (Cr 202). This configuration allows the resonant converter to operate at a frequency that is below the resonant frequency of the series resonant converter 100 of FIG. 1 in a so called discontinuous mode. The magnetizing inductance Lm 212 allows for soft switching when the diodes 214, 216 at the secondary side of the transformer 206 are not conducting.

Figure 3:
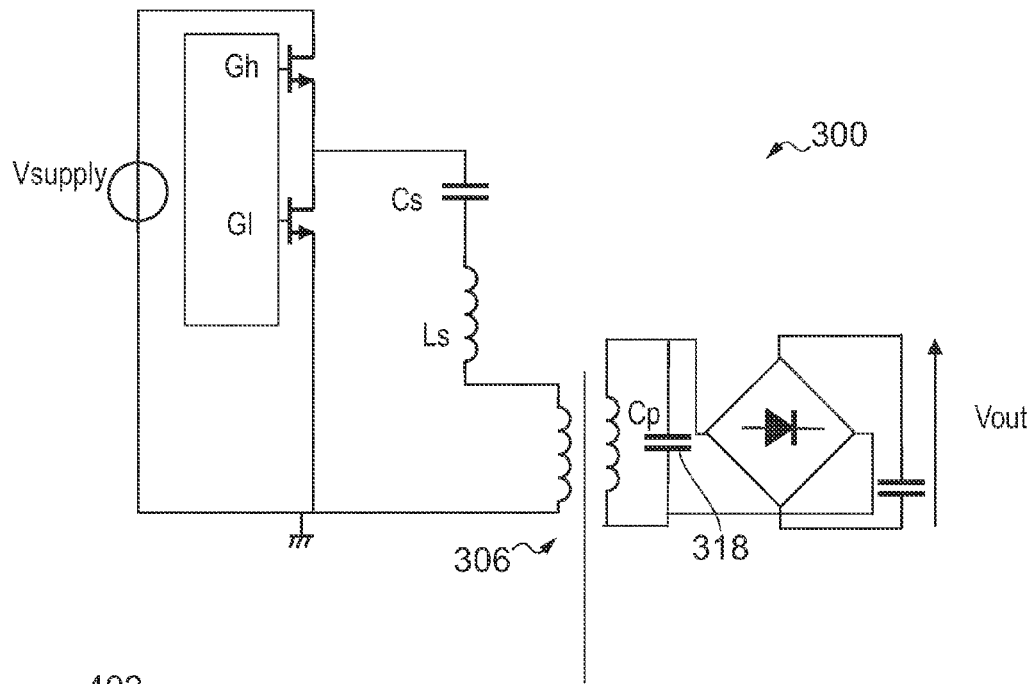
FIG. 3 illustrates schematically an LCC converter.

Another type of multi resonant converter is an LCC converter 300 as shown in FIG. 3. A second resonant capacitor Cp 318 is connected in parallel with the secondary winding of the transformer 306 in the LCC converter 300 of FIG. 3. The parallel capacitor Cp 318 can give a low output voltage at high switching frequency, while the LLC converter gives a fixed output voltage at high switching frequency.

The LLC converter is most often used for regulation of output power when a fixed output voltage is necessary, and is typically controlled with a 50% duty cycle at the half bridge node between the high side switch and low side switch. The switching frequency can then be varied in order to regulate the output power. This method gives an acceptable efficiency for medium to large loads, however, for low loads, there is a drawback of a relatively large circulating current, which results in a reduced efficiency at low load. It is known to improve this efficiency at low loads by using a burst mode of operation, where the 50% duty cycle mode is applied during a burst on-time. After the burst on-time, both of the high side and low side switches (which are also known as half bridge switches) are turned off. A problem with known burst modes is associated with setting the proper frequency, because the frequency-power relation is steep and the tolerance of components affects the resonance frequency, which in turn can lead to an inaccurately defined output power level. It is known in the art to set the frequency during a burst at a level that is higher than the normal operating frequency to account for the inaccurately defined output power level. A simulation result of a known burst mode of operation for an LLC converter is shown as FIG. 4.

Figure 4:
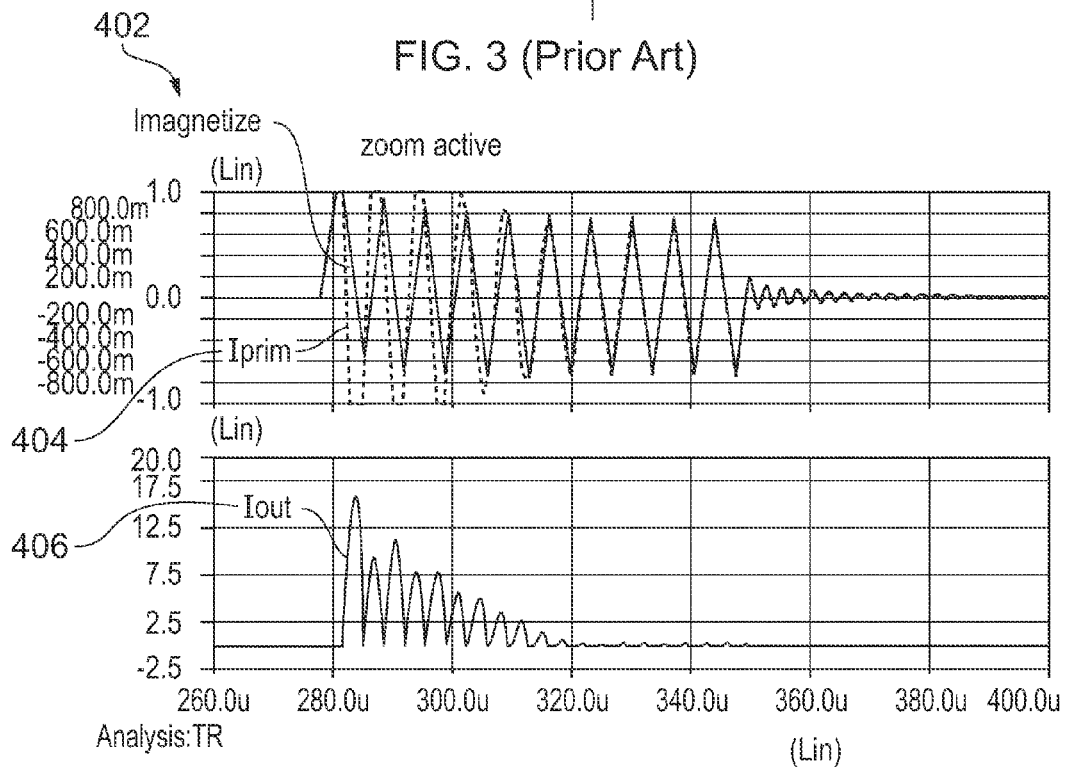
FIG. 4 shows a simulation result of a known burst mode of operation for an LLC converter.

The simulation result of FIG. 4 shows two graphs. The top graph illustrates (i) the current through the magnetizing inductance of the transformer, and is labelled Imagnetize 402; and (ii) the current through the primary winding of the transformer, which is labelled Iprim 404. The bottom graph shows the output current Iout 406.

It can be seen from FIG. 4 that, after the start of the burst, the output current Iout 406 is low, and therefore the steady state output power level is also low. This occurs after the time indicated as 320 usec in FIG. 4. It can be seen that a relatively large power is transferred to the output during the initial cycles of the burst due to the transient caused by the initial voltage at the resonant capacitor. Use of this burst mode gives an increased efficiency compared with a continuous mode of operation, however the increase is limited to a maximum efficiency of approximately 75%.

WO2009/098640 discloses the setting of an "energy per cycle" level in a low power mode of operation in order to improve efficiency. In addition, circulating magnetizing current is prevented as much as possible by temporarily storing magnetizing energy in the resonant capacitor in combination with an energy dump to the load, further improving efficiency.

In many applications, the output of the converter is regulated to a desired value using a feedback loop that compares the desired value with the sensed value, in order to generate an error signal in accordance with the difference.

One or more embodiments disclosed herein can provide a resonant power converter with one or more of:
- a high efficiency over load, which can include good efficiency at very small load at an acceptable audio noise level;
- stable control for output power, output voltage, output current between no load and maximum load at nominal output voltage;

Embodiments disclosed herein can provide an advantageous way of changing over between different modes of operation of a resonant converter and/or setting the energy level during a power conversion cycle. Such a resonant converter can be considered as improved over a complete variation of parameters.

Figure 5:
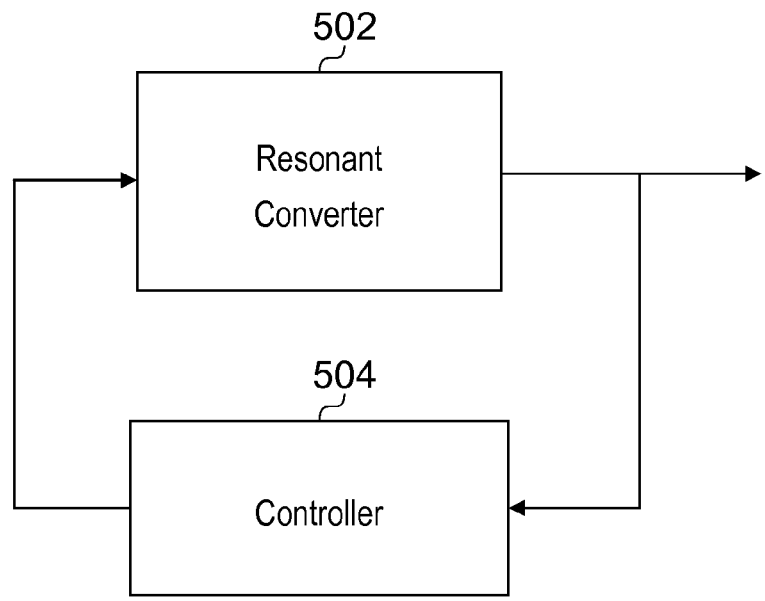
FIG. 5 illustrates a resonant converter and a controller according to an embodiment of the invention.

FIG. 5 illustrates a resonant converter 502 and a controller 504 according to an embodiment of the invention. The controller 504 provides switch control signals to operate the switches of the resonant converter 502 in accordance with one or more control parameters in order to operate the resonant converter in either a high power mode of operation or a low power mode of operation. The controller 504 is configured to set the value of a control parameter associated with the low power mode of operation when changing between the high power mode of operation and the low power mode of operation such that the output power is substantially consistent during the changeover. This can prevent, or reduce the likelihood of, repetitive changeover between the modes of operation as the output power fluctuates at changeover, which can reduce audio noise and also ripple voltage at the output. Examples of ways to implement this functionality are described below.

It is known from WO2009098640 to operate the resonant converter in a high power mode where only the energy per cycle parameter can be varied in order to adjust the output power, and also in a low power mode where both energy per cycle and period time parameter can be varied in order to adjust the output power. However, the period time makes a sudden jump to a longer value when changing from high power mode to low power mode. Embodiments of the present invention can include the application of a scaling factor to set the converted energy per cycle for a low power mode of operation in order to compensate for this sudden jump. In this way the output power in low power mode can be made approximately equal to, or overlap with, the output power in high power mode at the changeover between modes of operation. In addition to this scaling factor, the energy per cycle and period time parameter can be varied to regulate the output power in low power mode.

Embodiments disclosed herein can use a low power mode whereby the power is regulated by adjusting (i) the energy per cycle; or (ii) the switching frequency; or (iii) both.

The "energy per cycle" will now be described with reference to the series resonant converter of FIG. 1, although it will be appreciated that the "energy per cycle" can also be defined for other types of converters. The energy per cycle can also be considered as the energy put into the resonant tank from the power supply and is related to the charge transferred from the power supply to the resonant tank during the interval that the resonant tank is connected to the supply. This corresponds to a time when the high side switch 108 in FIG. 1 is closed, and causes a voltage difference deltaV across the resonant capacitor Cr 102. As Q=Cr×deltaV, this value of deltaV corresponds to a certain charge. The average current I drawn from the supply over a complete cycle is then:

$$I=Q/T\text{per}=Q\times F\text{switch}=Cr\times \text{delta}V\times F\text{switch};$$

and the power taken from the supply is then:

$$P=I\times V\text{supply}=Cr\times \text{delta}V\times F\text{switch}\times V\text{supply}.$$

As power is energy per time, the energy per cycle E:

$$E=P\times T\text{per}=P/F\text{switch}=Cr\times \text{delta}V\times V\text{supply}.$$

As the average voltage across Cr 102 cannot change in steady state, deltaV during the opposite switch conduction cycle will be identical but with the opposite sign. According to the prior art, the energy per cycle is not set directly for high power mode with frequency control, but is related to the frequency of operation of the switches 108, 110 that is applied. By using deltaV as a direct control criterion for driving the switches (which may be referred to as capacitor voltage control) the energy per cycle can be set directly. This method of capacitor voltage control is therefore very suited to drive both low and high power modes according to embodiments of the invention, although is in no way the only way of voltage control that can be used with embodiments of the invention.

When reducing the output power, there is a desire to keep the efficiency as high as possible. In some examples, it has been found that a particularly good efficiency in low power mode is achieved by applying an optimum, fixed, value for the energy per cycle setting and varying the switching frequency. Using such a value for the energy per cycle can give a good compromise between RMS losses and core losses that is substantially independent of the period time that is used. In light of the above, it can be considered advantageous in some examples to regulate the output power in low power mode of operation by adjusting the switching frequency and maintaining the converted energy per cycle at a constant value.

In other examples it is considered advantageous to regulate the output power in low power mode of operation by adjusting one or both of the parameters: (i) the switching frequency and (ii) the converted energy per cycle. This can for example be advantageous when the energy per cycle at the changeover point from high power mode to low power mode is at a value that is above the optimum efficiency setting. When the power is regulated down in low power mode it can be beneficial to first regulate the energy per cycle down to the optimum efficiency point whilst keeping the switching frequency fixed, and then keep the energy per cycle at the optimum efficiency level and reduce the switching frequency to reduce the output power further.

Embodiments of the invention disclosed herein can include a resonant converter that can operate in one or more of:
 a high power mode with power regulation by energy per cycle control;
 a low power mode with a fixed value for the energy per cycle, whereby the output power is regulated by adapting the period time; and
 a low power mode whereby the output power is regulated by adapting the period time and the energy per cycle. This low power mode may be used in addition to the preceding low power mode, for example to bring an energy per cycle value at the changeover down to a preferred value, after which the low power mode can be used with the fixed value for the energy per cycle.

whereby a changeover from the high power mode to a low power mode occurs at a certain energy per cycle level. At this changeover the energy per cycle value that was being used in the high power mode is multiplied by a predetermined factor in order to determine the value for the energy per cycle that will be used at the start of the low power mode of operation. In this way, any power step due to the step increase of the period time can be compensated for. The predetermined factor is selected such that any discontinuity in the output power when changing from the high power mode of operation to the low power mode of operation can be reduced when compared with the prior art.

In some examples any discontinuity when changing between modes of operation can be overcompensated for, for example by multiplying the energy per cycle by a factor that overcompensates for the step increase of the period time at changeover. In this way, the output power would then be too large and the regulation loop further reduces the power. This overcompensation therefore fits within the goal of keeping the output power substantially consistent. This is also a way to build in some hysteresis in the changing between modes of operation of the resonant converter.

Embodiments of the invention are described in relation to varying a load from a maximum value to a no/zero load value. The output of the converter can be a voltage, current or power, depending on the actual application and load conditions.

Figure 6:
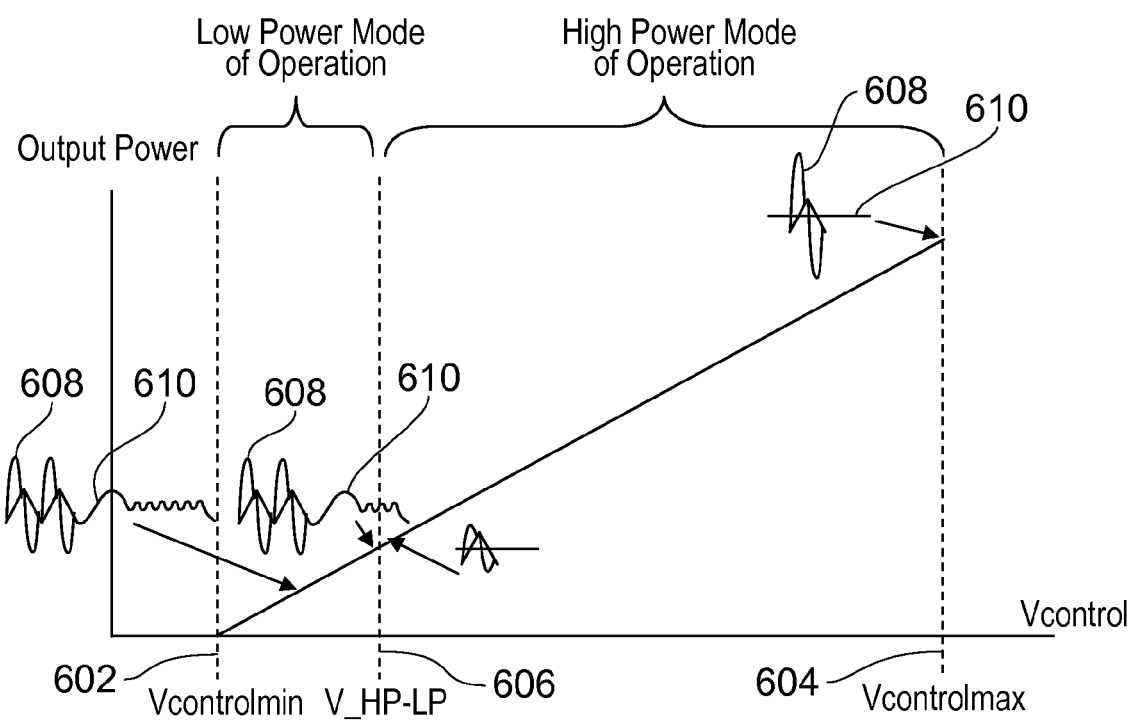
FIG. 6 illustrates graphically the operation of a resonant converter that is controlled according to an embodiment of the invention.

FIG. 6 illustrates graphically a relationship between a control variable on the horizontal axis and the output power on the vertical axis for a resonant converter that is controlled according to an embodiment of the invention. FIG. 6 illustrates the performance of the resonant converter as the control variable reduces from a maximum value towards zero. In this example an LLC resonant converter is used and the control variable is a control voltage (Vcontrol) that can adapt the output power (output current) between zero and full load over a voltage range between Vcontrolmin 602 (which in this example is 1V) and Vcontrolmax 604. It will be appreciated that using a control variable in the voltage domain, as well as the range of values, are non-limiting examples of how the output power can be controlled.

The resonant converter that is represented by FIG. 6 operates in a low power mode of operation, which can be a low power mode of operation that is disclosed in WO2009098640 and involve use of a fixed "energy per cycle" value and a variable switching frequency. It will be appreciated that the "switching frequency" parameter relates to the inverse of the time period of a complete switching cycle (Tper of FIG. 8).

As shown in FIG. 6 the resonant converter changes from the high power mode of operation to the low power mode of operation when the Vcontrol signal drops below a threshold value V_HP-LP 606.

FIG. 6 also includes sketches of the shapes of the primary current 608 and magnetizing current 610 of the transformer at different operating points over a complete switching cycle.

In high power mode, a duty cycle of about 50% is often used for the on time for both of the primary switches in the resonant converter, although embodiments of the invention are not limited in this regard. As the output power level is reduced in the high power mode of operation, the "converted energy per cycle" is reduced as can be seen from the decreasing amplitude of the primary current 608. When the control variable (Vcontrol) is reduced such that it reaches the threshold level V_HP-LP 606, the controller causes the resonant converter system to change to the low power mode of operation. This is illustrated in FIG. 6 as the primary current 608 does not oscillate for the complete switching period, and the magnetization current 610 does not comprise a triangular waveform when the primary current stops flowing, but instead starts ringing.

It can be seen from FIG. 6 that the amplitude of the energy conversion pulses in the primary current 608 immediately increases after the changeover from high power mode to low power mode. This is one embodiment of how the output power can be kept substantially consistent at the changeover. This is because there is a larger time between energy conversion pulses in low power mode and therefore each energy conversion pulse needs to have a larger amplitude to maintain a similar time averaged output power.

It can also be seen from FIG. 6 that the amplitude of each energy conversion pulse in the primary current 608 is kept constant as the power decreases in low power mode, and that the length of time between successive energy conversion pulses increases. This is indicative of the energy per conversion cycle being kept constant and the switching frequency being reduced.

The low power mode represented by FIG. 6 will be described in more detail with reference to FIG. 7, and is also described in W02009098640. In an example circuit (FIG. 1 and FIG.2 of W02009098640), the primary circuit current 14 ($I_{prim}$), the voltage at the capacitor terminal 12 ($V_{cap}$), the voltage at the half-brid node 10 ($V_{hb}$), output current 16 ($I_{out}$), the high-side switch 19 (HSS) and the low-side switch 18 (LSS) are depicted.

Figure 7:
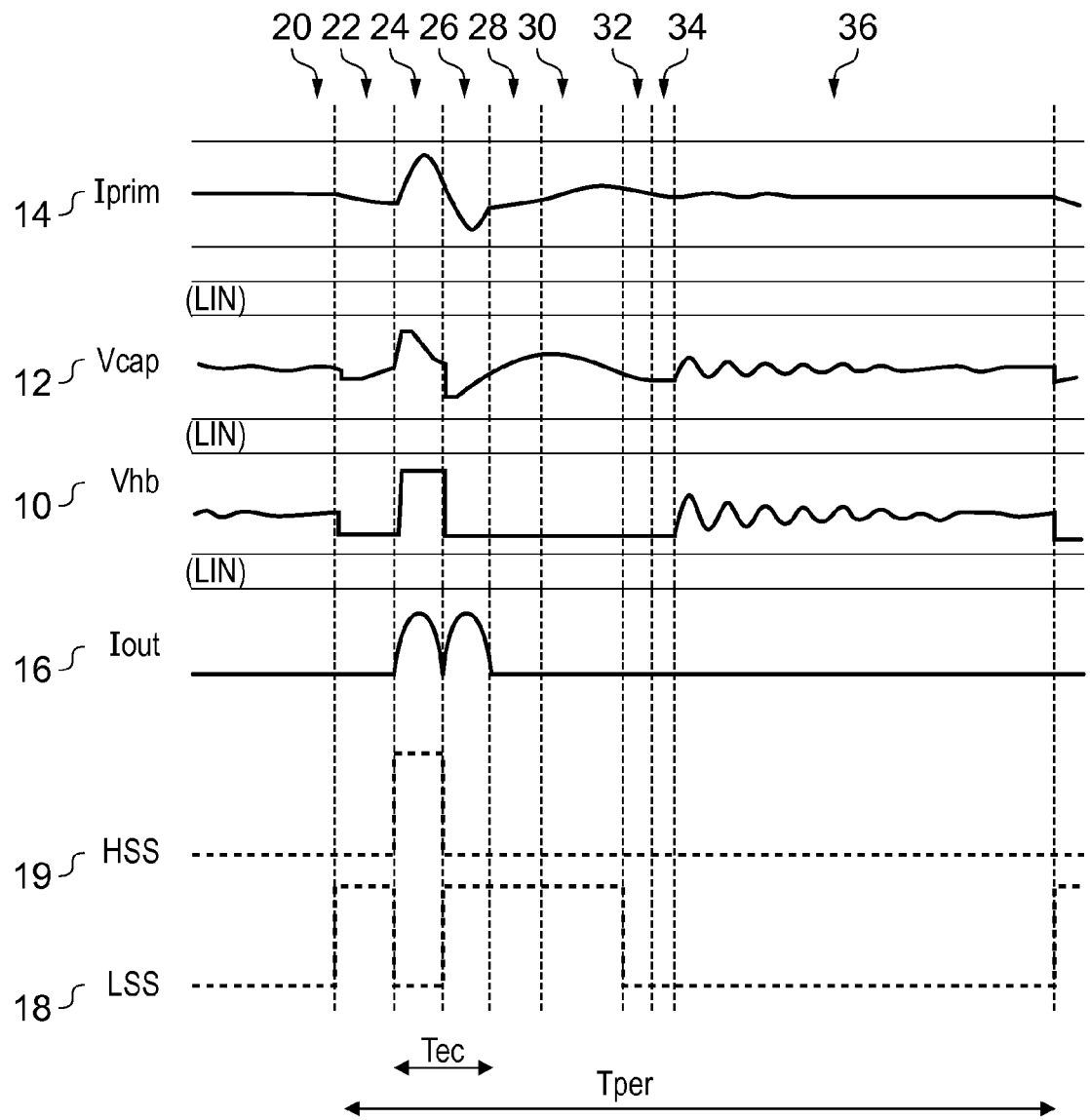
FIG. 7 illustrates graphically the performance of a resonant converter in a low power mode of operation according to an embodiment of the invention.

The low power mode of operation can be described in association with a so called 'energy conversion interval', which is represented by the intervals 24, 26 of FIG. 7 and is used to define the "energy per cycle" parameter disclosed herein. In FIG. 7, only one energy conversion pulse in the energy conversion interval is included in a complete sequence, but in general any integer number of energy conversion pulses is possible. It is also possible to include a so called "energy dump interval" where at a predetermined point within the intervals 26, 28 the low side switch is opened during a short period. During this short period, magnetizing energy is converted to the load, giving the additional advantage that during the rest of interval 26-34 and during the next 22 interval less core losses occur giving a higher efficiency. Under certain conditions it is even possible to skip the interval where the low side switch is closed again after the energy dump. In this case the end of interval 34 is automatically reached.

For the low power mode of FIG. 6, two energy conversion pulses are used within one complete switching cycle. This can be seen by the two complete oscillations in the primary current 608. This energy conversion interval is the same as one complete period in high power mode. In FIG. 6, one complete switching period is shown for the high power mode of operation. The output current (scaled to primary) is the difference between primary current 608 and magnetizing current 610.

It will be appreciated that the signals shown in FIG. 7 illustrate a non-limiting example of a low power mode of operation that can be used with embodiments of the present invention, and that other low power modes, which may or may not use the same basic variables of energy per cycle and Tper, can be used.

Figure 8:
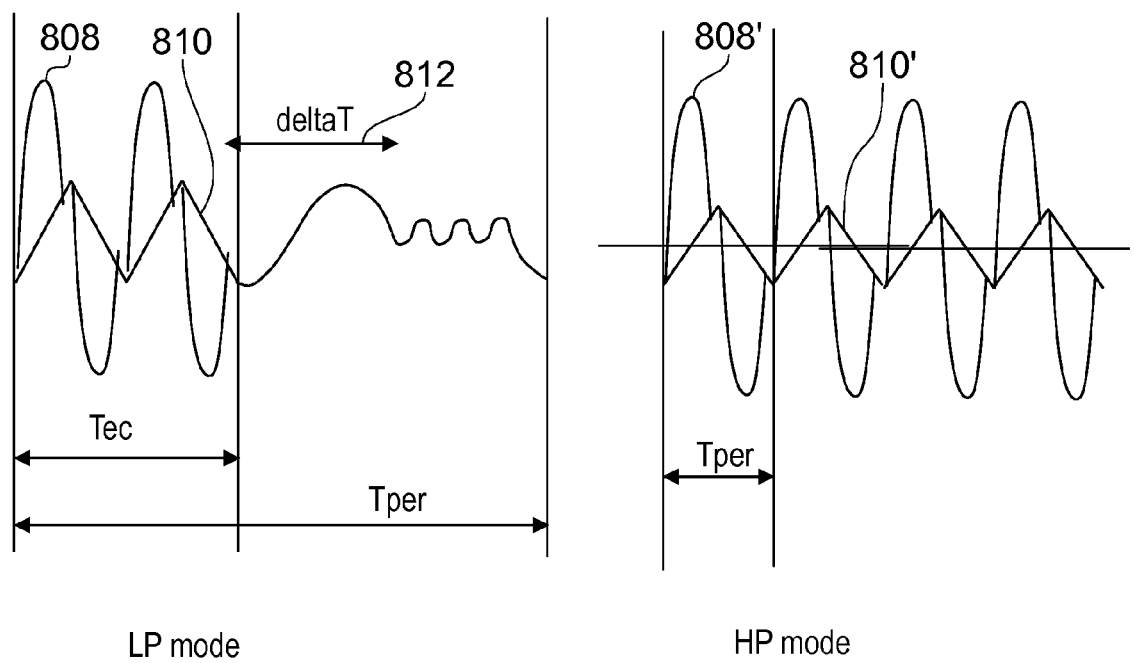
FIG. 8 illustrates the primary current and magnetizing current for a low power mode of operation according to an embodiment of the invention.

FIG. 8 illustrates the primary current 808 and magnetizing current 810 for the low power mode of operation, and the primary current 808' and magnetizing current 810' for the high power mode of operation, with equal levels set for the converted energy per cycle and magnetizing current. That is, the amplitude of the primary current 808, 808' is the same in both the high power mode of operation and low power mode of operation. It will be appreciated that when the amplitude of the primary currents 808, 808' are the same, the output power will be greater for the high power mode of operation due to the pauses between energy conversion pulses in low power mode of operation.

The ratio between the average output current that is delivered to the load in high power mode and low power mode for the waveforms that are illustrated in FIG. 8 (that is, with the same energy per cycle) is:

$$N = T\text{per}/T\text{ec} \quad (1)$$

Where:
Tper is the period time in low power mode, and
Tec is the length of time that energy is converted.

During one example of a low power mode that can be used with embodiments of the invention, it is desired to keep the converted energy per cycle at a substantially constant value in order to have good efficiency. Therefore, the time-averaged output power in low power mode is regulated by adjusting the period time (Tper), while keeping the converted energy per cycle (and hence amplitude of the primary current) at a constant value.

In another example of a low power mode that can be used with embodiments of the invention, it is desired to adjust the converted energy per cycle from a first value at changeover from high power mode to low power mode to a second value as the output power is reduced. The energy per cycle can then be kept substantially constant at the second value for further output power reductions.

An embodiment of the invention relates to a manipulation of the energy per cycle value in for a low power mode of operation when changing from a high power mode of operation such that the time-averaged output power changes continuously during the changeover, and any discontinuities that may be introduced by the prior art are reduced.

In order to achieve the desired converted output power level at both sides of the threshold from the high power mode to the low power mode (V_HP-LP 606 in FIG. 6), the step in power due to the ratio N is compensated by multiplying the energy per cycle value for the low power mode with a factor N (according to the ratio of Tper/Tec) at the mode changeover. In this way, the energy per cycle is increased for low power mode by a factor that corresponds to the reduction in power that would have occurred if the energy per cycle had been kept constant across the changeover.

The frequency of operation (and hence Tper) just after entering the low power mode (that is close to the left-hand side of V_HP-LP 606 in FIG. 6) is another parameter that affects the output power. It will be appreciated from the above discussion that Tper for the low power mode must be known in order to determine the correct value of N that should be applied.

Looking to FIG. 7, and taking into account the resonant frequencies during the conversion interval while the secondary diodes are conducting (energy conversion intervals 24,26, Cr and Ls resonate) and the resonant frequency during the intervals where the secondary diodes are not conducting (energy storage intervals 28-34 and energy restorage interval 22 Cr and Ls+Lm resonate), a criterion can be set for the minimum ratio N close to the mode changeover. For this criterion, it is assumed that:

the total period of time covered by intervals 28-34, 22 is approximately equal to the resonant period time of Cr×(Ls+Lm), and the total period of covered by intervals 24, 26 is approximately 1.1×P×the resonant period time of Cr×Ls, where P is the number of energy conversion intervals per complete low power cycle, and the constant factor of 1.1 is used to provide a margin for the diode-off window during the energy conversion intervals. This criterion can be considered as defining a minimum value for N as it involves consideration of the minimum period time at the mode changeover. In principle, any larger value for the minimum period time is also possible, although may be less advantageous as larger peak currents would be necessary to achieve the same power level, which in turn causes extra RMS losses.

The interval 36 is used to regulate the period time (Tper) in the low power mode of operation, and therefore it needs to have a certain minimum value at the V_HP-LP border, which in some examples can take into account tolerances and design variations of Ls and Lm. Example values for N for different values of P, including a maximum ratio Lm/Ls of 7 and that take into account the above mentioned considerations, are given in Table 1 below:

TABLE 1

| Energy pulses/cycle (P) | N |
| --- | --- |
| 1 | 3.34 |
| 2 | 2.17 |
| 3 | 1.78 |

In order to further reduce the output power level when the resonant converter enters the low power mode of operation, the period time (Tper) is increased. This is illustrated by the example signals for the primary current 608 in the low power mode of operation. In principle the period time can be increased to an infinite value in this way in order to bring the output power down towards zero.

Figure 9:
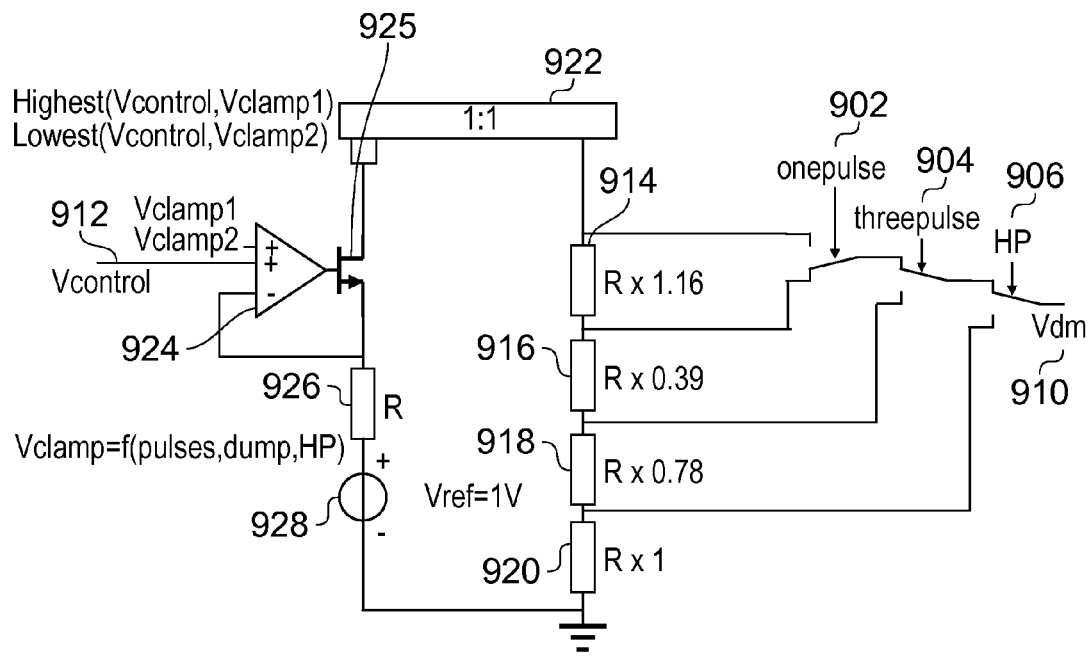
FIG. 9 illustrates schematically an implementation that can be used to adjust the energy per cycle according to an embodiment of the invention.

FIG. 9 illustrates schematically an implementation that can be used to adjust the energy per cycle according to an embodiment of the invention. The "energy per cycle" is one example of a parameter that is controlled in order to adjust the output power.

The circuit of FIG. 9 receives:

a Vcontrol input signal 912 representative of the desired output power;

an HP input signal 906 representative of whether the resonant converter should operate in a high power or low power mode of operation; and onepulse and threepulse input signals 902, 904 representative of how many energy conversion cycles are to be included in a switching cycle (Tper in FIG. 8) when operating in a low power mode of operation.

By processing the above input signals, the circuit of FIG. 9 provides an output signal at node Vdm 910 that is representative of the required "energy per cycle" value in order to operate according to an embodiment of the invention. The output signal at node Vdm 910 represents of the result of a multiplication factor N (as determined by onepulse and threepulse input signals 902, 904) being applied to the control signal (Vcontrol input signal 912) if a low power mode of operation is being employed (as determined by the HP input signal 906). If a low power mode of operation is not being employed, then a multiplication factor N of 1 is used.

The Vcontrol signal 912 (which is an example of a control variable in the voltage domain) is provided to a voltage to current converter, and the resultant current is provided as an input to the current mirror 922. The voltage to current converter comprises an amplifier 924 that receives the Vcountrol signal 912. The output of the amplifier 924 is connected to the gate of a FET 925. The conduction channel of the FET is connected in series with a resistor 926 and a DC offset voltage source 928 between ground and the input to the current mirror 922. It will be appreciated that any other type of voltage to current converter could be used.

The magnitude of the current that is provided to the input of the current mirror 922, using the well known equation I=V/R, depends on:

the magnitude of the resistor 926, which in this example is R; and the voltage across the resistor 926. In this example, the voltage across the resistor 926 is the value of the control signal (Vcontrol 912) minus the value of the DC offset voltage source 928. The DC offset voltage source 928 of FIG. 9 has a value of 1V, which corresponds to the value of Vcountrolmin 602 in FIG. 6.

The current mirror 922 provides an output current that is equal to the input current; the current mirror provides a 1:1 ratio between its input and output. The output current is provided to four resistors 914, 916, 918, 920 in series. The Vdm output voltage value 910 can then be tapped off from a position in the chain of resistors 914, 916, 918, 920 to provide the required multiplication factor in accordance with the mode of operation of the resonant converter.

The resistance values of the four resistors 914, 916, 918, 920 are selected to provide the desired values for N. In this example, the values of N identified in Table 1 above are used and:

resistor 920 has a value R, which is the same as the resistance value of the resistor 926 at the input side of the current mirror 922 in order to provide N=1;

resistor 918 has a value of 0.78×R so that the sum of the resistances of resistors 920 and 918 equals 1.78×R, and N=1.78;

resistor 916 has a value of 0.39×R so that the sum of the resistances of resistors 920, 918 and 916 equals 2.17×R, and N=2.17;

resistor 914 has a value of 1.16×R so that the sum of the resistances of resistors 920, 918, 916 and 914 equals 3.34×R, and N=3.34.

The onepulse 902, threepulse 904 and HP 906 input signals are used to control associated switches in order to connect the Vdm output node 910 to one of the junctions between the four resistors 914, 916, 918, 920. In this way an appropriate multiplication factor can effectively be applied to the Vcontrol signal 912 when the resonant converter is operating in a low power mode of operation such that a more smooth handover between the different modes of operation can be achieved. This, in turn, can reduce the likelihood of the resonant converter repeatedly switching back and forth between different modes of operation when changing mode.

The circuit of FIG. 9 receives an HP input signal 906 that is representative of whether the system should operate in high power mode or low power mode. When the HP input signal is representative of a high power mode of operation, the HP switch in FIG. 9 is in the lower position and the voltage across the single resistance 920 is tapped off as the Vdm output node 910. As the resistance value of resistor 920 is equal to the resistor 926 at the input side of the current mirror, the voltage that is tapped of to the Vdm node 910 is equal to the voltage across the resistor 926. As discussed above, the voltage that is dropped across the resistor 926 at the input side is equal to Vcontrol minus the DC offset.

When the HP input signal is representative of a low power mode of operation, the HP switch in FIG. 9 is in the upper position, and the voltage that is provided to the Vdm output can be:

the voltage across the sum of resistors 920 and 918 in order to apply a multiplication factor of 1.78. The multiplication factor of 1.78 is applied when the threepulse signal 904 is active;

the voltage across the sum of resistors 920, 918 and 916 in order to apply a multiplication factor of 2.17. The multiplication factor of 2.17 is applied when the onepulse and threepulse signals 902, 904 are inactive;

the voltage across the sum of resistors 920, 918, 916 and 914 in order to apply a multiplication factor of 3.34. The multiplication factor of 3.34 is applied when the onepulse signal 902 is active and the threepulse signal 904 is inactive.

The circuit of FIG. 9 can operate with one, two or three energy conversion intervals, although any number of intervals can be used in other embodiments. FIG. 6 illustrates operation with two energy conversion cycles in low power mode, and FIG. 7 illustrates operation with one energy conversion cycle.

The amplifier 924 also receives two threshold signals: Vclamp1 and Vclamp2, which are used to limit the values of Vcontrol 912 that are converted to the current that is passed through resistor 926. Vclamp1 defines a lower limit of Vcontrol 912 and Vclamp2 defines an upper limit. As illustrated in FIG. 9, the energy per cycle will be limited to the level as set by vclamp1 if vcontrol is lower than vclamp (Highest(Vcontrol,Vclamp1)). This feature allows a reduction in the energy per cycle level in low power mode until Vcontrol reaches Vclamp1, below which Vcontrol is held at vclamp1, and the energy per cycle is kept fixed. Also, the level of Vclamp2 is used to limit the energy per cycle to a maximum level in low power mode (Lowest(Vcontrol, Vclamp2)). The values for Vclamp1 and Vclamp2 can be set in accordance with:

the state of the HP input signal 906, which defines whether the resonant converter is operating in a high or low power mode of operation;

the state of the onepulse and threepulse input signals 902, 904, which define how many energy conversion pulses are used per cycle in the low power mode of operation; and a "dump" parameter.

The "dump" parameter is a mode selection input for the logic part of the converter that is used to select if an "energy dump" interval is included or not, and is known from prior art document WO2009098640. For example FIG. 7 of WO2009098640 illustrates an energy dump interval 150. Introducing an energy dump interval gives a slight change in the optimum energy per cycle for getting maximum converter efficiency. This also holds for the number of energy conversion pulses selected. With energy dump, the optimum efficiency can occur at a slightly lower energy per cycle compared to a "no dump" implementation. Therefore Vclamp1 can be chosen slightly lower if 'dump' is selected, as the level of Vclamp1 sets the lower limit for Vcontrol down to where the energy per cycle is reduced when Vcontrol is lowered.

The values for Vclamp1 and Vclamp2 are set so as to provide a high power mode of operation whereby the "energy per cycle" parameter is adjusted in order to change the output power, and a low power mode of operation whereby a switching frequency and/or the energy per cycle parameter is adjusted to change the power. The energy per cycle parameter is kept constant during the low power mode of operation for values of Vcontrol less than Vclamp1. Such operation is described below.

When the resonant converter is in the high power mode of operation (HP 906 is active) Vclamp1 is set as a low value and Vclamp 2 is set as a high value that is outside the range of Vcontrol (912). In this way, the value for Vcontrol 912 is always between the two clamp values and is copied to the source of the MOST follower 925. Therefore, in the high power mode of operation, the value at the Vdm output node 910 is proportional to Vcontrol−Vref and the converted energy per cycle is varied in order to adjust the output power of the resonant converter.

Figure 10:
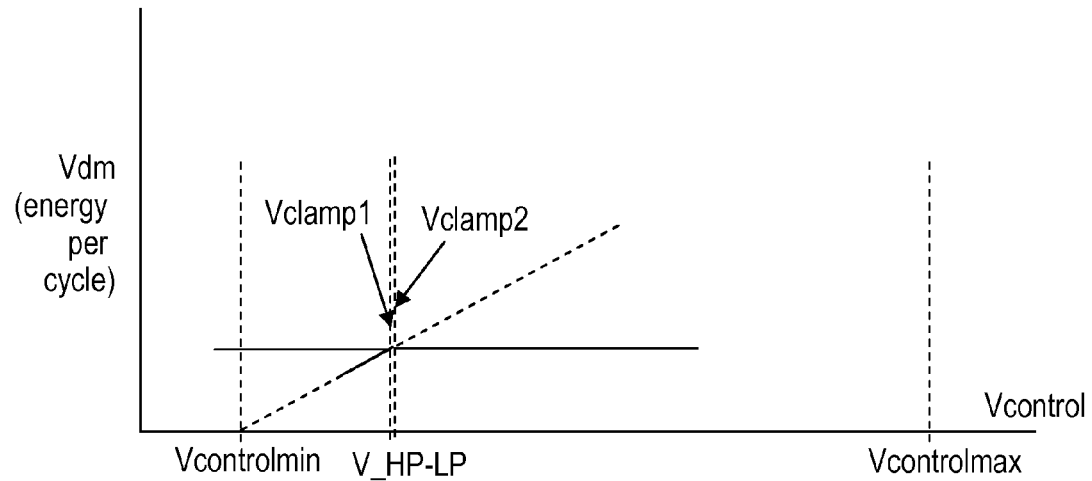
FIG. 10 illustrates graphically the operation of the resonant converter in a low power mode according to an embodiment of the invention.

In one example, when the resonant converter is in the low power mode of operation (HP 906 is inactive), both Vclamp1 and Vclamp2 are set as a value that corresponds to the voltage at which the resonant converter changes from the high power mode of operation to the low power mode of operation. This changeover point is described above with reference to V_HP-LP 606 in FIG. 6. In this way, the desired fixed energy per cycle value is applied at the HP-LP changeover point and is then maintained for lower powers. It will be appreciated that in order to reduce the output power further (and maintain a constant value for the energy per cycle), reducing the frequency of operation is one way of further reducing the output power. FIG. 10 illustrates graphically the operation of the resonant converter in a low power mode whereby both Vclamp1 and Vclamp2 are set as a value that corresponds to V_HP-LP. It can be seen that the value for Vdm, and hence the value for the energy per cycle parameter is fixed and independent of the output power that is required. In this way the values for Vclamp1 and Vclamp2 define the energy per cycle in low power mode, and also when Vcontrol is greater than V_HP-LP if Vclamp1 and Vclamp2 are still applied.

Figure 11:
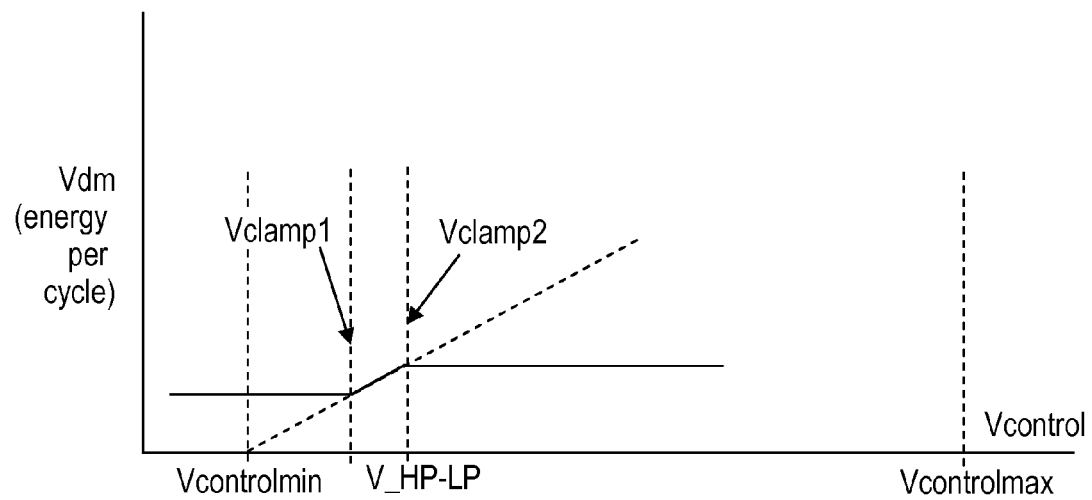
FIG. 11 illustrates graphically the operation of the resonant converter in a low power mode according to another embodiment of the invention.

FIG. 11 shows an alternative example whereby Vclamp1 is set at a value below Vclamp2, and the value for Vclamp2 generally corresponds with V_HP-LP. In this way, the energy per cycle can be reduced when the resonant converter is operating in the low power mode of operation only when the value for Vcontrol is greater than Vclamp1. When Vcontrol drops below Vclamp1, the energy per cycle is fixed and the switching frequency must be changed in order to reduce the output power further. Therefore, a low power mode can be entered that initially involves reducing the energy per cycle, and then reducing the frequency and keeping the energy per cycle fixed.

This embodiment can be used when at the changeover point from high power mode to low power mode, the energy per cycle is larger than the optimum energy per cycle. Therefore, this embodiment can be advantageous to reduce the energy per cycle during the low power mode until it reaches an optimum value, at which point it can be fixed. In such an example, it is possible to keep the period time fixed during the interval where the energy per cycle is being reduced, although embodiments that vary both the energy per cycle and period time (Tper) within this interval can also be provided.

In another embodiment, Vclamp2 can be set as a value that is higher than V_HP-LP. It is recalled that V_HP-LP is the changeover from high power mode to low power mode, and is not necessarily the same as the changeover point from low power mode to high power mode. In this example, increasing Vcontrol above V_HP-LP will cause Vdm to be increased whilst still operating in low power mode up until the maximum level is reached as defined Vclamp2. This embodiment can be advantageous when at the changeover point from high power mode to low power mode, the energy per cycle is smaller than the optimum energy per cycle. The advantage lies in the fact that the energy per cycle can be increased before the resonant converter changes back to a high power mode of operation. In this example it is possible to keep the period time fixed during the interval where the energy per cycle is increased, although embodiments that vary both the energy per cycle and period time (Tper) within this interval can also be provided.

Figure 12:
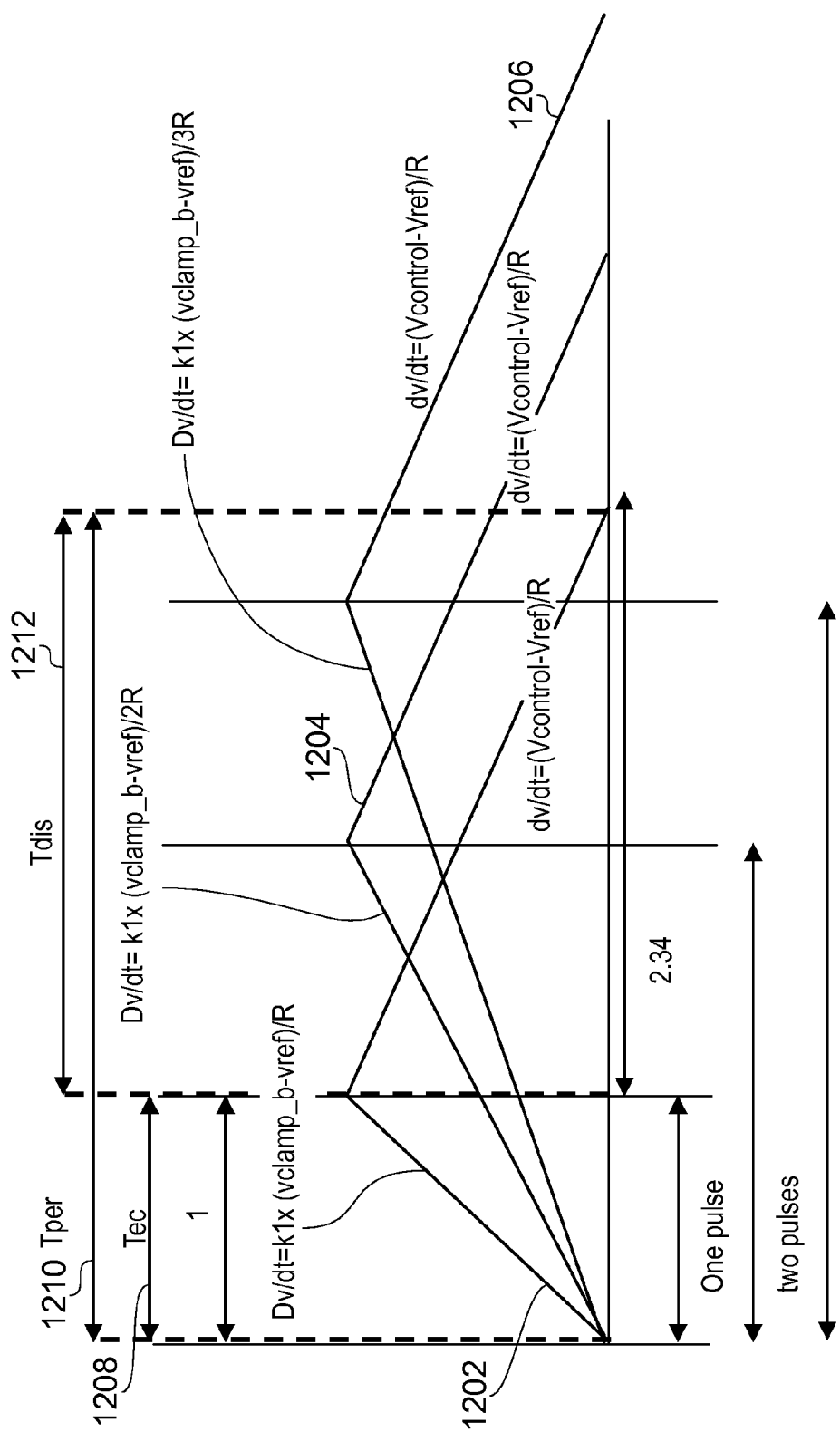
FIG. 12 illustrates graphically a function that regulates the operating frequency in a low power mode according to an embodiment of the invention.

FIG. 12 illustrates graphically a function that regulates the operating frequency in low power mode. The functionality of FIG. 12 can be implemented by the circuit of FIG. 13 as described below. The vertical axis of the graph is the voltage at capacitor 1302 in FIG. 13, and the horizontal axis is time. FIG. 12 shows how the current changes (by the dv/dt giving the slope of the voltage at the capacitor 1302) for an implementation that uses a single energy conversion pulse 1202, two energy conversion pulses 1204 and three energy conversion pulses 1206. In addition, the energy conversion period (Tec) of the single energy conversion pulse 1202 example is identified with reference 1208, and the total time period of the cycle (Tper) with a single pulse is identified with the reference 1210. The difference between Tper 1210 and Tec 1208 is referred to as the discharge time Tdis, and is identified in FIG. 12 with reference 1212

It will be appreciated from the illustration of a low power waveform in FIG. 8, that the length of the interval Tec (during which energy conversion pulses are generated) is dependent on (i) the number of energy conversion pulses (P); and also (ii) the product of the capacitance value of the resonant Cr and the inductance value of the resonant inductor Ls. The capacitance value of the resonant Cr and the inductance value of the resonant inductor Ls affect the frequency with which the resonant tank oscillates and therefore the duration of the energy conversion pulses that are shown in FIG. 8.

The value of N (Tper/Tec) is dependent on (i) the number of energy conversion pulses (P); and (ii) the ratio of the inductance values Ls/Lm. The value of N is not dependent on the capacitance value of the resonant capacitor Cr. It is necessary to make the discharge interval Tdis 1212 directly dependent on Tec in order for the desired value of N at V_HP-LP to be maintained, even if the value of Tec is changed. If the resonant capacitor Cr is changed for various applications, then Tec changes as it is directly the copied timing of the switches. Using FIG. 7 for further explanation of one example: if Cr doubles, then the interval 24+26 of FIG. 7 (which equates to Tec) is increased by 41%, and the interval 28 to 34 (which equates to Tdis) also increases by 41% as it scales with Cr in the same way as Tec. This relationship requires Tdis to be directly proportional to Tec, which is automatically achieved by the circuit of FIG. 13 as the capacitor C 1302 is charged for a 41% longer time to a 41% higher voltage, and therefore so discharging also takes 41% longer. Furthermore, it is also necessary to make the interval Tdis 1212 a function of the control parameter in order to properly regulate the power.

Although the value for Tec 1208 could be set externally by a user, this would require extra pins on an integrated circuit (IC) that houses the resonant converter and/or would require programming for setting the required level. However, embodiments disclosed herein seek to integrate the functionality illustrated by FIG. 12 on-chip, and therefore it is beneficial to avoid the use of additional pins and external programming in such embodiments. Embodiments disclosed herein can provide on-chip adaptive setting of the Tdis parameter as a function of both Tec (in order to keep N constant at the V_HP-LP border) and as a function of Vcontrol using Vclamp_a and Vclamp_b (in order to linearly increase Tdis with Vcontrol when Vcontrol is lower than Vclamp_a). This enables N to be correctly set according to Table 1 when Vcontrol is equal to Vclamp_a and Vclamp_b.

As described above in relation to FIG. 10, both Vclamp_a and Vclamp_b are set equal to V_HP-LP when a fixed energy per cycle level is used and the frequency is reduced in order to reduce the output power in low power mode. This enables N to be correctly set according to Table 1 when Vcontrol is equal to V_HP-LP.

Alternatively, if Vclamp_a and Vclamp_b are both set to a value that is below V_HP-LP, then this still gives the same N at the V_HP-LP border (both charging and discharging current for C1302 are reduced with the same factor by reducing both Vclamp_a and Vclamp_b in the same way) but Vcontrol is only influenced when Vcontrol is less than Vclamp_a (which equals Vclamp_b), and this enables the functionality of reducing Vcontrol by first keeping the frequency fixed and reducing the energy per cycle, and then keeping the energy per cycle fixed and further reducing the frequency. This reduction in frequency can be achieved by increasing Tdis. In relation to the example of FIG. 9, this functionality can be achieved by setting Vclamp1 of FIG. 9 to the value of Vclamp_a and Vclamp_b. This gives the changeover from energy per cycle reduction to frequency reduction at Vcontrol=Vclamp_a=Vclamp_b=Vclamp1.

FIG. 12 illustrates that the slope of the increasing current is different for each of the one pulse, two pulse and three pulse waveforms 1202, 1204, 1206 such that the maximum current at the end of Tec 1208 is the same for each of the one pulse, two pulse and three pulse waveforms 1202, 1204, 1206. As will be described with reference to FIG. 13, the increasing current represents a period of time during which a capacitor is being charged and the different slopes are enabled by introducing different resistance values into the capacitor charging circuit.

During the discharge interval Tdis 1212, the capacitor is discharged with a current that depends on the control parameter (Vcontrol), but does not depend on the number of energy conversion pulses P. That is, the slope of the current during the Tdis interval is independent of the length of the capacitor charging interval Tec 1208.

Figure 13:
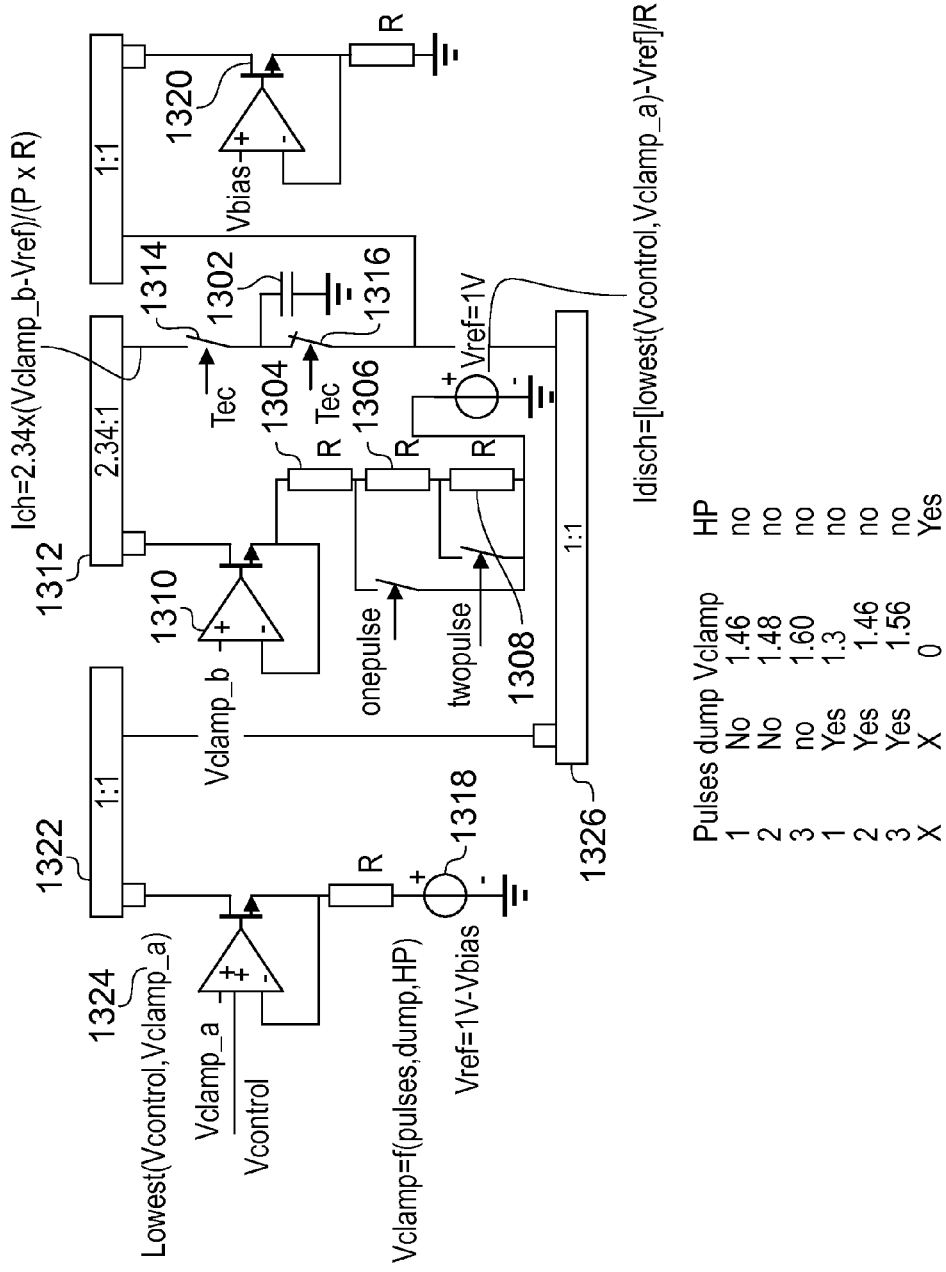
FIG. 13 illustrates schematically a circuit that can implement the functionality of FIG. 12.

It can be advantageous for the slope of the charging current to be set at a value that is inversely proportional to P because it reduces the maximum voltage window of the capacitor 1302 due to variations in the values of Cr, Ls and P. In the example of FIG. 12, the slope of the charging voltage for each waveform is:

$$dv/dt = k1 \times (V\text{clamp}\_b - V\text{ref})/(P \times R)]$$

where R is the resistance value of each of the resistors in the charging circuit of FIG. 13. By using resistors with equal resistance values, the slope of the charging current can be set at a value that is inversely proportional to P. In this way, the dependence on P of the factor N is automatically realized. An additional advantage is that the maximum voltage at the capacitor is almost constant for different P values.

The end of the cycle (Tper 1210) is defined by the current reaching the same value as at the start of Tec 1208.

The functionality illustrated by FIG. 12 can be considered as adaptive behaviour as the component values of the resonant tank affect the Tec 1208 interval, which in turn affects the Tper 1210 interval, and therefore also affects the output power. Therefore, the values of the components in the resonant tank can be adjusted/adapted in order to change the output power while maintaining the proper Tdis value. It will be appreciated that in embodiments where the ratio Tper/Tec (N) is kept constant, the Tper interval 1210 will also be adjusted as Tec interval 1208 is changed.

If the desired output power increases whilst the converter is in the low power mode of operation, and the control parameter is allowed to rise sufficiently, there will be a lower limit of the minimum period time that can be implemented as the interval 36 in FIG. 7 becomes zero or a minimal value. At this point the converter must change to the high power mode of operation in order for the output power to be increased further.

In some embodiments, a low power mode of operation with energy dump can be used as identified above and explained in WO02009098640 at page 25, line 32 to page 26, line 12. The result of this mode of operation is that the intervals 28,30,32, 34 identified in FIG. 7 are skipped and interval 36 is almost immediately reached after the end of Tec. That is, the interval shown with reference deltaT 812 in FIG. 8 can be skipped.

The effect of this low power mode of operation is that the power can now be increased much further in low power mode. Therefore the level Vclamp_a can be set slightly higher than V_HP-LP, while Vclamp_b can be set equal to V_HP-LP. This prevents the frequency from being further increased when Vcontrol gets above Vcontrol_a, but keeps the required N according to Table 1 at Vcontrol=V_HP-LP. This gives the criterion to change back from low power mode to high power mode to occur at approximately the same Vcontrol when this CCM energy dump is used.

FIG. 13 shows a functional schematic diagram for implementing the functionality of FIG. 12.

An integrator capacitor 1302 is used for realizing the integration/timing illustrated by FIG. 12. It will be appreciated that this capacitor solution is only one specific embodiment, and that any analogue or digital circuit or computer algorithm that can perform an integration or counting action in the time domain during the Tec and Tdis (Tper-Tec) intervals with predefined factor in the integration according to FIG. 12 can be used.

During the energy conversion interval Tec 1208, the capacitor 1302 is charged by a current 2.34×(Vclamp_b−Vref)/(P×R), where P represents the number of pulses in the energy conversion period Tec, and R represents the resistance value of each of the resistors 1304, 1306, 1308 described below.

The circuit of FIG. 13 includes two different Vclamp levels (Vclamp_a and Vclamp_b), the significance of which is described below. At this stage in the description of FIG. 13, the values of Vclamp_a and Vclamp_b can be considered as sufficiently similar such that they can be referred to as having the same value of Vclamp.

The circuit of FIG. 13 includes three resistors 1304, 1306, 1308 of equal value in series. Two input signals onepulse and twopulse are used to control associated switches in order to selectively include or bypass the resistors 1304, 1306, 1308 as part of a voltage to current converter 1310. In this example, the voltage to current converter 1310 is used to convert the Vclamp_b voltage to a current that is inversely proportional to resistance of those resistors 1304, 1306, 1308 in the resistor chain that are in use.

The current that is provided by the voltage to current converter 1310 is used as an input to a current mirror 1312 with a mirror ratio 2.34:1. The value of 2.34 is used to define a charge current that is 2.34 times as large as the discharge current in order to give the voltage at 1302 the shape according to FIG. 12 and N the correct value according to Table 1 when the lowest of Vcontrol and Vclamp_a equals Vclamp_b (lowest(Vcontrol,Vclamp_a)=Vclamp_b). The output of the current mirror 1312 is used to charge the integrator capacitor 1302 during the energy conversion period Tec, and the output of the current mirror 1312 is disconnected from the integrator capacitor 1302 after expiry of the energy conversion period Tec using switch 1314. The charging current (Ich) can be defined as:

$$Ich=2.34\times(Vclamp\_b-Vref)/(P\times R)$$

During the discharge interval Tdis (Tper−Tec), a second switch 1316 is closed to provide a discharge path for the integrator capacitor 1302 to the output of a 1:1 current mirror 1326. The capacitor is discharged with a current lowest (Vcontrol,Vclamp_a)−Vref]/R.

The left-hand side of the circuit of FIG. 13 includes a voltage to current converter 1324 that receives Vcontrol and a lower clamping limit (Vclamp_a) as input signals. Connected in series with the output of the voltage to current converter 1324 is a reference voltage source Vref 1318. The output of the voltage to current converter 1324 is connected to the input of a first 1:1 current mirror 1322, and the output of the first 1:1 current mirror 1322 is connected to the input of the 1:1 current mirror 1326 that is identified above. These components 1318, 1324, 1322 can be considered as defining the discharge current of the capacitor.

The output of the circuit is the voltage across the capacitor 1302 as function of time, which is illustrated by FIG. 12, and can be used to start the next energy conversion period Tec when the voltage across capacitor 1302 reaches the same value as at the beginning of the Tec interval.

As shown in FIG. 13, an extra DC voltage signal Vbias is subtracted from the offset DC voltage source Vref 1318 in order to provide an additional bias current Vbias/R in the current mirrors. The additional bias current can be required in some embodiments to keep the current mirrors biased with a minimum current when Tper becomes large, thereby providing a long delay between the energy conversion intervals Tec of successive cycles. Using this minimum current can reduce or prevent unwanted parasitic and oscillating behaviour. However, the additional discharge current can disturb the process of discharging the capacitor 1320. Therefore the same bias current is separately added to the discharge current of the capacitor 1302 by a further voltage to current converter 1320 that is used to convert the bias voltage level to a current level that is consistent with the additional current introduced by the DC offset voltage source Vref 1318.

Further details of the use of two different Vclamp values (Vclamp_a and Vclamp_b) will now be described.

When Vcontrol equals the value of Vref 1318+Vbias, the current at the output of the first current mirror 1322 will equal the current at the output of the voltage to current converter 1320 such that the currents cancel each other at the capacitor 1302. This in turn causes the period time in low power mode to be made very large and tend towards infinity whilst maintaining a bias current for the current mirrors. By setting the voltage level Vclamp_b of the second voltage to current converter 1310 equal to the changeover point from high power mode to low power mode (V_HP-LP of FIG. 6), the desired ratio of Tper/Tec (N) is obtained at the mode changeover.

The voltage clamp level Vclamp_a of the first voltage to current converter 1324 can be set at a value that is slightly higher than Vclamp_b (and therefore also slightly higher than V_HP-LP) such that the output power can be increased further by increasing Vcontrol (the control variable) above the value V_HP-LP. This enables a further increase in the frequency when the output power is being increased in low power mode, and a reduction of N (Tper/Tec) as function of Vcontrol. This increase in the frequency can be made until the interval 36 shown in FIG. 7 becomes zero, a predefined minimal value, or until Vclamp_a of the first voltage to current converter 1324 is reached. These are all examples of criteria for changing over to the high power mode of operation.

Figure 14:
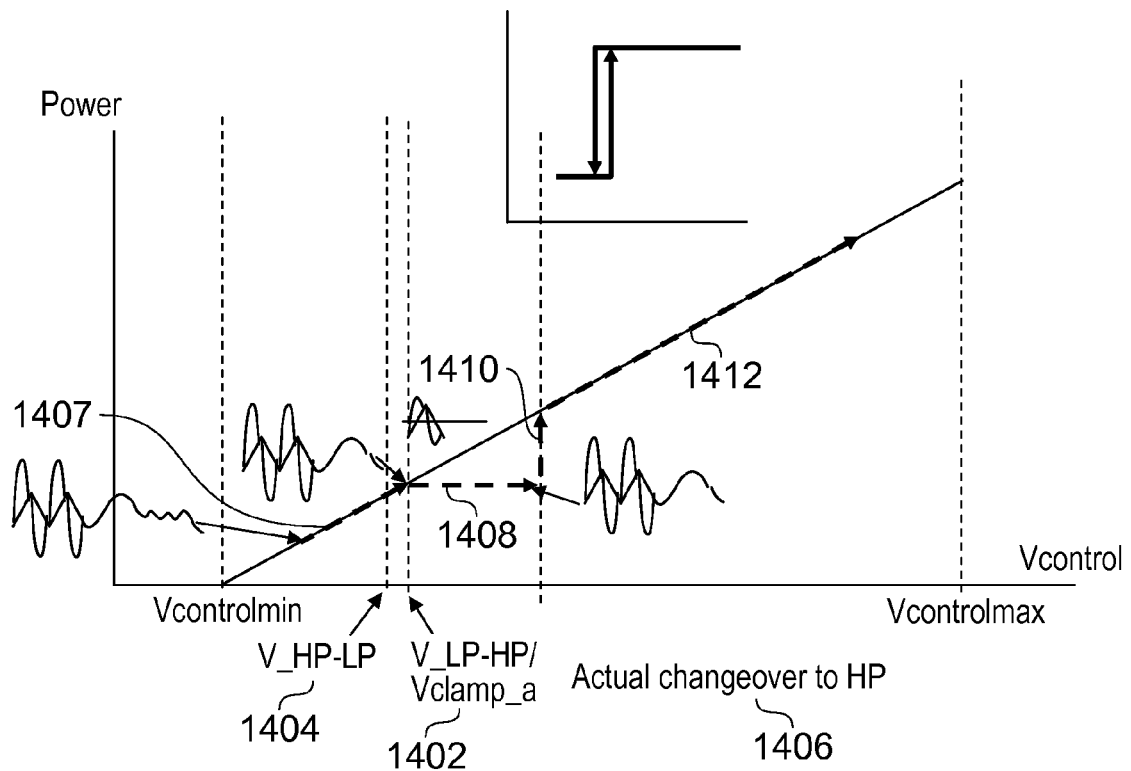
FIG. 14 illustrates graphically the operation of a resonant converter that is controlled according to an embodiment of the invention.

An embodiment for realizing the changeover to the high power mode of operation can utilise a regulation loop that increases the control variable during the low power mode of operation. There will come a point at which the power cannot be further increased whilst remaining in the low power mode of operation, and when vcontrol reaches the associated threshold value for the control variable the changeover to high power mode takes place. In this way hysteresis can be created between the changeover point from high power to low power mode, and vice versa. This is shown in FIG. 14. It can also be possible to switch back to high power mode when Vcontrol is larger than the threshold or in combination with a timer criterion. The effect is that the system can allow a lack of power to be delivered for a certain time, causing the regulated output to drop slightly.

FIG. 14 includes all of the features of FIG. 6 in relation to a reduction in the output power, and also illustrates the changeover from the low power mode of operation to the high power mode of operation as the output power increases. The changeover from the low power mode of operation to the high power mode of operation is shown as V_LP-HP 1402 in FIG. 14.

The hysteresis of FIG. 14 can be achieved by setting Vclamp_a 1402 of the first voltage to current converter 1324 of FIG. 13 to a level that is above the V_HP-LP 1404 threshold for Vcontrol, while Vclamp_b for the second voltage to current converter 1310 of FIG. 13 is set at the V_HP-LP 1404 threshold for Vcontrol in order to get the optimum N according to Table 1 at the high power mode to low power mode changeover point, while the frequency can still be increased when Vcontrol increases above the V_HP-LP 1404 changeover point, thereby entering the hysteresis region.

The bold dotted line of FIG. 14, which is shown with reference numbers 1407, 1408, 1410, 1412, shows the output power that can be produced for an increasing value of Vcontrol according to an embodiment of the invention.

In some examples the resonant converter may not immediately change from a low power mode to a high power mode when the Vcontrol signal reaches the V_LP-HP 1402 level. The same can be true for the changeover from high power mode to low power mode. Two example reasons for the delay in changing mode of operation are:

1. use of a timer that ensures that a minimum period of time is spent in a mode of operation before changing again. Such a timer can be started as soon as a mode of operation is entered and can be used to prevent a further change of mode until the timer has expired. This can be useful in allowing the regulation loop to settle and for any overshoots to be dealt with.
2. use of a filter to process the Vcontrol signal so as to reduce the effects of any ripple that may be present in the control signal. Such a filter can inherently introduce a delay between the instantaneous value of the control signal crossing a threshold and the filtered signal reaching the same threshold.

An example of such a delay in changing from a low power mode of operation to a high power mode of operation will now be described with reference to FIG. 14. It will be appreciated that although the actual changeover is shown as occurring at voltage 1406, the changeover is not dependent on the voltage at 1406, but instead is representative of an instant in time when Vcontrol happens to be at the level of 1406. A dependence on time cannot be directly represented by FIG. 14.

As the control voltage increases whilst the resonant converter is in the low power mode of operation, the output power gradually increases and follows the line 1407 in FIG. 14. When Vcontrol reaches the Vclamp_a 1402 value, any further increases in Vcontrol are not considered (such functionality can be implemented by the circuit of FIG. 13 for example) and, as long as the resonant converter is in low power mode of operation, the output power cannot continue to increase. This is represented in FIG. 14 by the horizontal line 1408, which represents a constant value for the output power.

The actual changeover to high power mode of operation occurs at 1406 in FIG. 14, and example timing issues are described above to explain why this may not occur immediately after Vcontrol reaches V_LP-HP. When the high power mode of operation is entered, the output power jumps to a value that would have occurred if the time delay had not been incurred, and this is represented by the vertical line 1410 in FIG. 14. The output power then continues to increase as Vcontrol increases as shown with reference 1412 in FIG. 14.

It will be appreciated that the embodiment of FIG. 13 is one non-limiting example implementation of how to achieve the desired functionality as shown in FIG. 12. Any other way of implementing the functionality described in relation to FIGS. 12 and/or 14 can be provided. For example, circuitry operating in the current domain instead of voltage domain can be used, and the Vcontrol signal can be replaced with a current signal, switched resistors can be replaced with switched currents, etc. In addition, the slope/ramp during Tec 1208 in FIG. 12 could be made constant, while making the slope/ramp during Tdis 1212 dependent on P in order to realize the proper N, digital implementation of the function, including counters.

When changing between low power mode and high power mode, or vice versa, it can be advantageous to allow only a changeover during certain subintervals of the conversion cycle to reduce or prevent instant disturbances of the resonant tank. For example, it can be advantageous for the changeover from low power mode to high power mode to take place during state 36 in FIG. 7. It can also be advantageous for the changeover from high power mode to low power mode to take place at the end of a complete cycle.

Also, it can be advantageous for the first cycle following a changeover between low power mode and high power mode, or vice versa, to start at a well defined state. For example, at changeover from high power mode to low power mode the first low power mode cycle should preferably start with state 28 in FIG. 7 in order to get a natural changeover. Such changeover conditions can be considered as features of one or more embodiments of the invention.

When a potential change between low power mode and high power mode, or vice versa, is identified it can be advantageous to prevent a changeover if the system was not operating for at least a certain minimum time in the current mode. A controller associated with the resonant converter can apply a minimum time interval between successive power mode changes. This is an advantage as it allows the regulation loop to settle to the new situation. Without this feature there is a risk that any transient effects that may occur will trigger the opposite mode of operation. This functionality can be implemented in software associated with the controller, or with hardware.

When a potential change between low power mode and high power mode, or vice versa, is identified it can be advantageous to prevent a changeover between high power mode and low power mode during one or more specific sub-state of the mode timing sequence, such as the high power mode sequence. Examples of such specific sub-states are all intervals except 24 and 26 shown in FIG. 7. Such sub-states can be indicative of an instant in time when changing the mode of operation would generate a discontinuity in the operation of the converter, and corresponding sub-states for different types of resonant converters and different modes of operation will be known to the person skilled in the art. This functionality can be implemented in software associated with the controller, or with hardware.

Burst Mode Operation

One or more embodiments disclosed herein can implement a burst mode of operation. There are several ways to implement burst mode in a switched mode power converter, which are prior art, for example starting the burst when the regulated output voltage of the converter becomes lower than desired and stopping the burst when it becomes higher than desired. Another prior art solution is to start the burst when the regulated output voltage of the converter becomes lower than desired and stop the burst after a well defined on time.

These prior art methods use ways to define the duration of the burst on time and burst repetition time, but the prior art methods do not define anything about the switching frequency within the burst on time.

Using the low power mode as described above, the operating frequency in the low power mode can occur in the audible region for output power levels below a certain limit. It can be considered disadvantageous for a user to be able to hear the resonant converter operating in the low power mode of operation. According to an embodiment of the invention, a low power mode can be adapted in order to compare an operating frequency with a certain audible limit (for example 18 kHz or 20 kHz), and prevent the operating frequency from dropping below that certain limit during a burst mode.

A more detailed description of this combination of features and also the criteria for switching between low power mode and high power mode and the corresponding settings for the converted energy per are given hereafter.

Below a certain power level, the switching frequency gets below the audible region, which in some examples can be considered as 20 kHz. Calculations and measurements show that a burst mode with a burst of pulses according to the low power mode, with a repetition frequency just above the audible region gives less audio noise than a burst mode using pulses according to the high power mode with the same average power level.

The combination of a burst mode that is prevented from dropping below an audible frequency limit (such as 20 kHz) along with other features disclosed herein can also be considered as an embodiment of the invention. A specific implementation where the operating frequency during the burst on time of the resonant converter is limited to a lower border/threshold that is close to the audible region of the human ear in order to improve audio noise performance offers significant advantages over the prior art because it has been found that the amount of audio noise can be reduced by choosing a switching frequency during the burst on time close to the upper side of the audio region. Audio noise requirements, for example in the power adapter market, are becoming increasingly significant.

It will be appreciated that the burst mode of operation disclosed herein in relation to a resonant converter can also be applied with any other type of converter that is known to operate in burst mode. A flyback converter is one example of a converter that can benefit from the advantages of a burst mode described herein.

In one embodiment, the functionality of FIG. 14 can be developed to include a burst mode of operation. The inclusion of such a burst mode of operation is illustrated graphically in FIG. 15.

Figure 15:
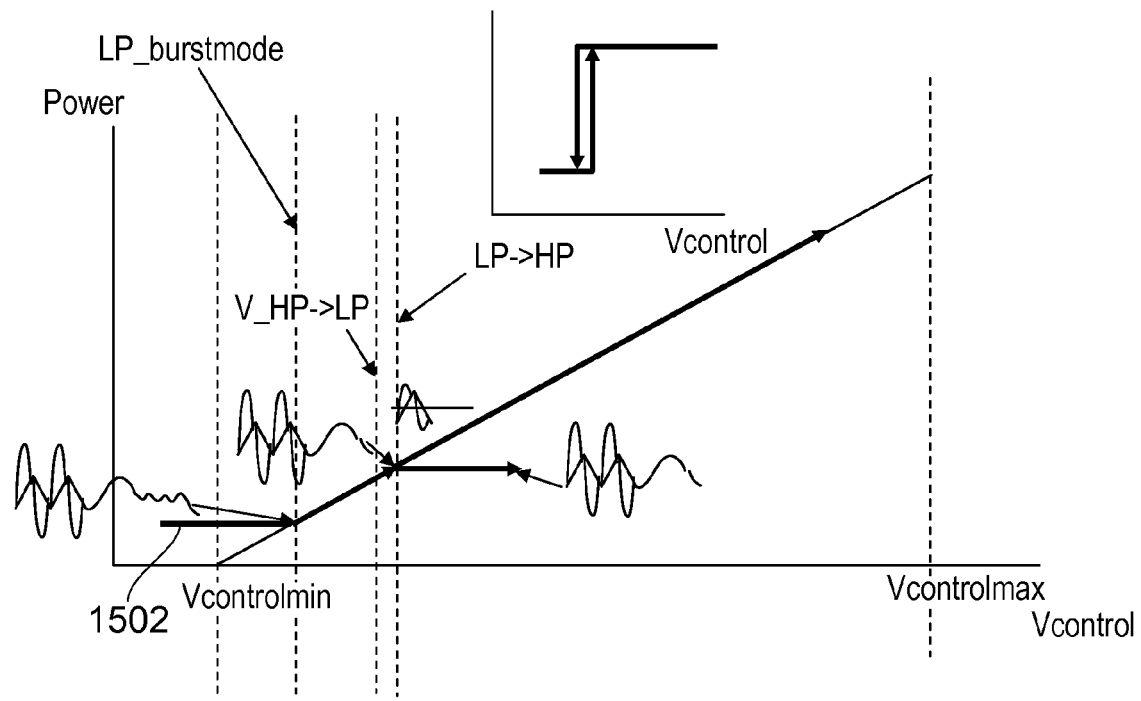
FIG. 15 illustrates graphically the operation of a resonant converter that is controlled according to another embodiment of the invention.

When the resonant converter is operating in the low power mode of operation, and the required output power continues to decrease, the frequency is regulated down by Vcontrol until the frequency reaches a minimum. This minimum can be set by a timer with a period time according to the desired frequency minimum that is started at the beginning of a low power cycle. When the period time of the low power cycle becomes longer than the timer period, the timer triggers the start of the next low power cycle, preventing the frequency from becoming lower than the limit. Assuming a fixed converted energy per cycle setting, this means that the minimum power cannot be reduced further. This is indicated in FIG. 15 by the horizontal line 1502 at the left side of the curve. In fact the system has now entered the burst on time. There are different possibilities for stopping the burst on time. This can be done by known prior art ways such as:

burst on time determined by error loop, for example Vcontrol crossing a minimum level;

fixed burst on time.

In all cases at the end of the burst on time, the converter is stopped until Vcontrol causes the next low power cycle to start. There are several ways to implement this, and two non-limiting examples are:

(burstmode1) During the burst on time the frequency limit is active, while during the burst off time the frequency limit is disabled. In this case Vcontrol will drop during the burst on time due to the surplus of power, automatically giving infinite period time as soon as the burst on time is stopped due to the Tper=F(Vcontrol) relation. As soon as Vcontrol rises again as result of a dropping output voltage the infinite period time will automatically be reduced until the next low power cycle starts. The start of the next low power cycle triggers the next burst on time, activating the frequency limit again.

(burstmode2) The frequency limit is always active, while during the burst off time the start of the next low power cycle is prevented, stopping the conversion. In this case Vcontrol will drop during the burst on time, but here infinite period time occurs as soon as the burst on time is stopped, stopping the converter. As soon as Vcontrol rises again as result of a dropping output voltage a Vcontrol threshold level is needed that triggers the next burst on time when it is crossed, switching on again the converter.

There may be provided a resonant converter including a high power mode where the converted energy per cycle can be adapted and a low power mode where the converted energy per cycle and the period time of a cycle can be independently adapted, and means for switching between low power mode and high power mode and setting the energy per cycle and switching frequency of the low power mode to levels for getting optimum behaviour.

There may be provided means to make the converted energy per cycle a function of a control variable in high power mode.

The resonant converter may further include means to make the converted energy per cycle, or the period time, or both, a function of a control variable in low power mode.

The resonant converter may further include means to let the changeover point from high power mode to low power mode depend on the value of a control variable and a minimum time interval to stay in high power mode, which time eventually might be zero.

The changeover between high power mode and low power mode may only be allowed during a specific sub-state of the high power mode sequence. The changeover between high power mode and low power mode may be followed by a specific sub-state of the low power mode sequence.

The resonant converter may further include means to let the changeover point from low power mode to high power mode depend on the combination of the value of a control variable and a minimum time interval to stay in low power mode, which time eventually might be zero.

The changeover between low power mode and high power mode may only be allowed during a specific sub-state of the low power mode sequence. The changeover between low power mode and high power mode may always be followed by the same specific sub-state of the high power mode sequence.

The converted energy per complete cycle in low power mode may be equal to the converted energy per complete cycle in high power mode at the changeover point from high power mode to low power mode, scaled with a predetermined factor.

The period time of the low power mode sequence may be a function of a control variable. The period time of the low power mode sequence may be dependent on the actual length in time of the energy conversion interval.

The period time of the low power mode sequence may be limited to a minimum determined by a subinterval of the low power mode (36) or a minimum determined by a clamp level at the control variable.

The control variable may depend on the error signal from the regulation loop.

Hysteresis may be present in the value of the control variable between the changeover point from low power mode to high power mode and the changeover point from high power mode to low power mode.

Within the low power mode, a burst mode may be included such that a lower limit of the switching frequency of the low power cycles is set, while the burst mode is activated when the lower limit of the switching frequency is reached. The burst mode may operate by the sequence of:

The burst on time starts when
burstmode1) a timer with a time setting as function of a control variable defining the period time of the low power cycles during the burst off time elapses or
(burstmode2) The control variable crosses a level At the beginning of the burst on time a burst on timer defining the burst on time is triggered The burst on time stops when the burst on timer elapses The lower limit may be associated with the audible range of the human ear. As an example, the lower limit may be between about 15 kHz and about 20 kHz, although it will be appreciated that any value can be used in order to prevent the converter from operating at a frequency that can be heard by the human ear.

Any kind of low power mode/high power mode combination where the energy per cycle (HP,LP) and period time (LP) can be set can be used.

It will be appreciated that although embodiments disclosed herein are based on an LLC resonant converter, one or more aspects of the functionality disclosed herein can be used with a series resonant converter operating in a continuous current mode (CCM). In addition, embodiments can be provided that use a half bridge plus an L+C+C in series for lighting applications (such as compact fluorescent lighting (CFL)), where the lamp is in parallel with one of the capacitors for example.

The invention claimed is:

1. A controller for a resonant converter, wherein the controller is configured to operate the resonant converter in:
a high power mode of operation by adjusting a first control parameter to a vary an output power; and
a low power mode of operation by adjusting a second control parameter to vary the output power; and
wherein the controller is configured to set a value of the first control parameter when changing over between the high power mode of operation and the low power mode of operation such that the output power is substantially consistent during the changing over;
wherein the first control parameter is an energy per cycle parameter; and
wherein the controller is configured to multiply the first control parameter by a factor N when changing between the high power mode of operation and the low power mode of operation, and wherein N corresponds to a ratio of a period time to a period of energy conversion pulses that will be employed in the low power mode of operation.

2. The controller of claim 1, wherein the controller is configured to keep the first control parameter constant for the low power mode of operation.

3. The controller of claim 1, wherein the controller is configured to operate the resonant converter in the low power mode of operation by:
adjusting only the first control parameter to vary the output power for output power levels above a threshold level, and
adjusting only the second control parameter for output power levels below the threshold level.

4. The controller of claim 1, wherein the controller is configured to operate the resonant converter in the low power mode of operation by:
adjusting both the first control parameter and second control parameter to vary the output power for output power levels above a threshold level, and
adjusting only the second control parameter for output power levels below the threshold level.

5. The controller of claim 1, further comprising an input representative of a number of energy conversion pulses that are to be included in the period of energy conversion pulses such that the number of energy conversion pulses affects the period of energy conversion pulses.

6. The controller of claim 1, wherein the period time is a minimum period time that can be used in the low power mode of operation.

7. The controller of claim 1, wherein the controller is configured to provide switch control signals to the resonant converter to control the output power in accordance with the control parameters of the high or low power mode of operation.

8. The controller of claim 1, wherein the controller is configured to apply a minimum time interval between successive power mode changes.

9. The controller of claim 1, wherein the controller is configured to prevent a changeover between high power mode and low power mode during at least one specific sub-state of a mode timing sequence.

10. The controller of claim 1, configured to operate the resonant converter in a burst mode of operation, wherein the converter is configured to prevent a switching frequency within a burst on time from corresponding to an audible frequency range of the human ear.

11. The controller of claim 1, wherein the controller is configured to prevent a frequency of operation in burst mode from dropping below about 20 kHz.

12. A method of operating a resonant converter, wherein the resonant converter is operable in:
a high power mode of operation by adjusting a first control parameter to vary an output power; and
a low power mode of operation by adjusting a second control parameter to vary the output power; the method comprising:
setting a value of the first control parameter when changing over between the high power mode of operation and the low power mode of operation such that the output power is substantially consistent during the changing over; and wherein the first control parameter is an energy per cycle parameter; and wherein the controller is configured to multiply the first control parameter by a factor N when changing between the high power mode of operation and the low power mode of operation, and wherein N corresponds to a ratio of a period time to a period of energy conversion pulses that will be employed in the low power mode of operation.

* * * * *